US012369189B2

(12) United States Patent
Xu et al.

(10) Patent No.: US 12,369,189 B2
(45) Date of Patent: Jul. 22, 2025

(54) LISTEN BEFORE TALK TECHNIQUES FOR WIRELESS COMMUNICATIONS SYSTEMS

(71) Applicant: QUALCOMM Incorporated, San Diego, CA (US)

(72) Inventors: Changlong Xu, Beijing (CN); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 307 days.

(21) Appl. No.: 17/760,437

(22) PCT Filed: Feb. 28, 2020

(86) PCT No.: PCT/CN2020/077082
§ 371 (c)(1),
(2) Date: Aug. 9, 2022

(87) PCT Pub. No.: WO2021/168770
PCT Pub. Date: Sep. 2, 2021

(65) Prior Publication Data
US 2023/0080801 A1     Mar. 16, 2023

(51) Int. Cl.
*H04W 72/12* (2023.01)
*H04B 7/06* (2006.01)
(Continued)

(52) U.S. Cl.
CPC .............................. *H04W 74/0808* (2013.01)

(58) Field of Classification Search
None
See application file for complete search history.

(56) References Cited

U.S. PATENT DOCUMENTS 10,368,372 B2 *   7/2019   Chendamarai Kannan ................. H04W 72/0446
10,455,488 B1    10/2019   Bendlin et al.
(Continued)

FOREIGN PATENT DOCUMENTS

| CN | 110730510 A | 1/2020 |
| WO | WO-2019193238 A1 | 10/2019 |
| WO | WO-2021034725 A1 | 2/2021 |

OTHER PUBLICATIONS

Qualcomm Incorporated: "DL Signals and Channels for NR-U", R1-1912936, 3GPP TSG RAN WG1 Meeting #98bis, 3rd Generation Partnership Project, Mobile Competence Centre, 650, Route Des Lucioles, F-06921, Sophia-Antipolis, Cedex, France, vol. RAN WG1, No. Reno, Nevada, US, Nov. 18, 2019-Nov. 22, 2019, Nov. 9, 2019, XP051823699, pp. 1-16, Sections 5-8.
(Continued)

*Primary Examiner* — Sithu Ko
(74) *Attorney, Agent, or Firm* — Holland & Hart LLP

(57) ABSTRACT

Methods, systems, and devices for wireless communications are described. A wireless device such as a UE or a base station may implement one or more listen before talk (LBT) techniques. The wireless device may determine to transmit a communication during a transmission time interval on multiple subbands of a radio frequency spectrum band. The wireless device may identify whether the transmission time interval is during a channel occupancy time for the base station for a first set of subbands of the multiple subbands. The wireless device may perform one or more LBT procedures based on the identification. For example, the wireless device may perform an LBT procedure that is selected for each subband based on identifying that the transmission time interval is during the channel occupancy time for the first set
(Continued)

of the subbands. The wireless device may transmit the communication based on a result of the LBT procedures.

26 Claims, 11 Drawing Sheets

(51) Int. Cl.
*H04L 5/00* (2006.01)
*H04L 27/00* (2006.01)
*H04W 74/0808* (2024.01)

(56) References Cited

U.S. PATENT DOCUMENTS

| | | | |
|---|---|---|---|
| 10,912,128 B2* | 2/2021 | Li | H04W 88/08 |
| 11,184,776 B2* | 11/2021 | Park | H04W 16/14 |
| 11,917,683 B2* | 2/2024 | Jung | H04W 74/006 |
| 12,166,609 B2* | 12/2024 | Li | H04L 5/0053 |
| 2019/0342045 A1 | 11/2019 | Radulescu et al. | |
| 2019/0349154 A1 | 11/2019 | Tsai et al. | |
| 2020/0045696 A1* | 2/2020 | Huang | H04L 5/0007 |
| 2020/0053782 A1 | 2/2020 | Zhang et al. | |
| 2020/0275430 A1* | 8/2020 | Salem | H04L 1/1614 |
| 2021/0392685 A1* | 12/2021 | Myung | H04W 72/1263 |
| 2022/0015147 A1* | 1/2022 | Zhang | H04L 5/0044 |
| 2022/0201747 A1* | 6/2022 | Tooher | H04L 5/0051 |

OTHER PUBLICATIONS

Supplementary European Search Report—EP20921337—Search Authority—The Hague Oct. 16, 2023 (202736EP).
Huawei, et al., "Transmission with Configured Qrant in NR Unlicensed Band", 3GPP Draft, 3GPP TSG RAN WG1 Meeting #97, R1-1906047, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019 May 13, 2019 (May 13, 2019), XP051727504, 22 Pages (Part 2), Retrieved from the Internet: URL: http://www.3gpp.org/ftp/Meetings%5F3GPP%5FSYNC/RAN1/Docs/R1%2D1906047%2Ezip [retrieved on May 13, 2019] Chapter 1 Introduction, Chapter 2.4.2.2 gNB-Triggered Transmission with Configured Grant, Chapters 3.2 HARQ ID Determination, 3.3 HARQ Feedback Indication, 5 CG-UCI on PUSCH, 6 Transmission Adaptation.
International Search Report and Written Opinion—PCT/CN2020/077082—ISA/EPO—Nov. 27, 2020 (202736WO1).

* cited by examiner

LISTEN BEFORE TALK TECHNIQUES FOR WIRELESS COMMUNICATIONS SYSTEMS

CROSS REFERENCE

The present application is a 371 national stage filing of International PCT Application No. PCT/CN2020/077082 by Xu et al. entitled "LISTEN BEFORE TALK TECHNIQUES FOR WIRELESS COMMUNICATIONS SYSTEMS," filed Feb. 28, 2020, which is assigned to the assignee hereof, and which is expressly incorporated by reference in its entirety herein.

FIELD OF TECHNOLOGY

The present disclosure relates generally to wireless communications and more specifically to listen before talk (LBT) techniques for wireless communications systems.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a wireless device (e.g., a UE or a base station) may implement a listen before talk (LBT) procedure before transmitting data. The wireless device may monitor a subband to determine if the subband is occupied. If the subband is occupied, the wireless device may wait to transmit the data at a later time when the subband is not occupied. However, in some cases the wireless device may be scheduled to transmit data over multiple subbands. In such cases, conventional LBT techniques may be relatively inefficient or result in interference of communications.

SUMMARY

The described techniques relate to improved methods, systems, devices, and apparatuses that support improved listen before talk (LBT) techniques for wireless communications systems. Generally, the described techniques enable a wireless device (e.g., a UE or a base station) to perform LBT procedures for multiple subbands of a radio frequency spectrum band. For example, a UE may determine to transmit one or more communications (e.g., uplink messages) over a set of subbands during a transmission time interval (TTI). The UE may identify which subbands, if any, are included in a channel occupancy time (COT) of the base station. For example, a base station may have medium access for a subset of the subbands (e.g., none of the subbands, a portion of the set of subbands, or all of the set of subbands) during the COT. In some examples, the UE may perform one or more LBT procedures for the set of subbands. For example, the UE may perform an LBT procedure (e.g., category 2 LBT, category 4 LBT, etc.) for a subband based on the TTI of the subband being included in the COT of the base station or outside of the COT of the base station. In such examples, the UE may transmit the one or more communications over the set of subbands based on a successful result of the one or more LBT procedures (e.g., the LBT procedures for each subband may indicate that the set of subbands are unoccupied). In some other examples, the UE may refrain from performing an LBT procedure, for example, based on determining that a portion of the set of subbands are included in the COT and a portion of the set of subbands are outside of the COT.

A method of wireless communications at a UE is described. The method may include determining to transmit, to a base station during a transmission time interval, an uplink message on a set of subbands of a radio frequency spectrum band, identifying that the transmission time interval is during a COT for the base station for a first set of subbands of the set of subbands, performing, for each subband of the set of subbands, an LBT procedure that is selected for each subband based on identifying that the transmission time interval is during the COT for the base station, and transmitting the uplink message on the set of subbands based on a result of the performed LBT procedure for each subband of the set of subbands.

An apparatus for wireless communications at a UE is described. The apparatus may include a processor, memory coupled with the processor, and instructions stored in the memory. The instructions may be executable by the processor to cause the apparatus to determine to transmit, to a base station during a transmission time interval, an uplink message on a set of subbands of a radio frequency spectrum band, identify that the transmission time interval is during a COT for the base station for a first set of subbands of the set of subbands, perform, for each subband of the set of subbands, an LBT procedure that is selected for each subband based on identifying that the transmission time interval is during the COT for the base station, and transmit the uplink message on the set of subbands based on a result of the performed LBT procedure for each subband of the set of subbands.

Another apparatus for wireless communications at a UE is described. The apparatus may include means for determining to transmit, to a base station during a transmission time interval, an uplink message on a set of subbands of a radio frequency spectrum band, identifying that the transmission time interval is during a COT for the base station for a first set of subbands of the set of subbands, performing, for each subband of the set of subbands, an LBT procedure that is selected for each subband based on identifying that the transmission time interval is during the COT for the base station, and transmitting the uplink message on the set of subbands based on a result of the performed LBT procedure for each subband of the set of subbands.

A non-transitory computer-readable medium storing code for wireless communications at a UE is described. The code may include instructions executable by a processor to determine to transmit, to a base station during a transmission time interval, an uplink message on a set of subbands of a radio frequency spectrum band, identify that the transmission time interval is during a COT for the base station for a first set of subbands of the set of subbands, perform, for each subband of the set of subbands, an LBT procedure that is selected for each subband based on identifying that the transmission time interval is during the COT for the base station, and transmit the uplink message on the set of subbands based on a result of the performed LBT procedure for each subband of the set of subbands.

In some examples of the method, apparatuses, and non-transitory computer-readable medium described herein, the LBT procedure for each subband of the set of subbands includes a same LBT procedure.

Some examples of the method, apparatuses, and non-transitory computer-readable medium described herein may further include operations, features, means, or instructions for determining that the transmission time interval may be during the COT for the base station for all subbands of the set of subbands, where the first set of subbands includes the set of subbands, and selecting the LBT procedure to be a category 2 LBT procedure.

Some examples of the method, apparatuses, and non-transitory computer-readable medium described herein may further include operations, features, means, or instructions for determining that the transmission time interval may be outside of the COT for the base station for all subbands of the set of subbands, where the first set of subbands includes the set of subbands, and selecting the LBT procedure to be a category 4 LBT procedure.

In some examples of the method, apparatuses, and non-transitory computer-readable medium described herein, transmitting the uplink message on the set of subbands may include operations, features, means, or instructions for identifying that a previous transmission time interval may be outside the COT for a second set of subbands of the set of subbands, refraining from performing the LBT procedure for a previous transmission time interval based on identifying that the previous transmission time interval may be outside the COT, and transmitting, during the uplink message on the set of subbands based on identifying that the transmission time interval may be during the COT for the base station for all subbands of the set of subbands or that the transmission time interval may be outside the COT for the base station for all subbands of the set of subbands.

Some examples of the method, apparatuses, and non-transitory computer-readable medium described herein may further include operations, features, means, or instructions for determining that the transmission time interval may be during the COT for all subbands of the set of subbands, where the first set of subbands includes the set of subbands, and selecting a same LBT procedure for each subband of the set of subbands based on the transmission time interval being during the COT for the base station for all the subbands.

Some examples of the method, apparatuses, and non-transitory computer-readable medium described herein may further include operations, features, means, or instructions for selecting a first subband of the set of subbands based on determining that the transmission time interval may be outside the COT for at least one subband of the set of subbands, and performing a first LBT procedure for the selected first subband of the set of subbands and a second LBT procedure for a remaining one or more subbands of the set of subbands.

In some examples of the method, apparatuses, and non-transitory computer-readable medium described herein, selecting the first subband may include operations, features, means, or instructions for selecting the first subband randomly from the set of subbands.

In some examples of the method, apparatuses, and non-transitory computer-readable medium described herein, the first LBT procedure includes a category 4 LBT procedure and the second LBT procedure includes a category 2 LBT procedure.

In some examples of the method, apparatuses, and non-transitory computer-readable medium described herein, performing, for each subband of the set of subbands, an LBT procedure may include operations, features, means, or instructions for selecting a first subband of the set of subbands, selecting a first LBT procedure for the selected first subband based on identifying that the transmission time interval may be outside the COT for the first subband, or a second LBT procedure for the selected first subband based on identifying that the transmission time interval may be during the COT for the first subband, and performing the second LBT procedure for a remaining one or more subbands of the set of subbands, the remaining one or more subbands different than the selected first subband.

In some examples of the method, apparatuses, and non-transitory computer-readable medium described herein, the first LBT procedure includes a category 4 LBT procedure and the second LBT procedure includes a category 2 LBT procedure.

In some examples of the method, apparatuses, and non-transitory computer-readable medium described herein, transmitting the uplink message on the set of subbands may be in response to the result of the performed LBT procedure for each subband of the set of subbands, including the first LBT procedure and the second LBT procedure, indicating that all subbands of the set of subbands may be clear.

In some examples of the method, apparatuses, and non-transitory computer-readable medium described herein, performing, for each subband of the set of subbands, an LBT procedure may include operations, features, means, or instructions for selecting a first subband of the first set of subbands, performing a first LBT procedure for the selected first subband, and performing a second LBT procedure for a remaining one or more subbands of the set of subbands.

In some examples of the method, apparatuses, and non-transitory computer-readable medium described herein, selecting the first subband may include operations, features, means, or instructions for selecting the first subband randomly from the first set of subbands for which the transmission time interval may be during the COT for the base station.

In some examples of the method, apparatuses, and non-transitory computer-readable medium described herein, the first LBT procedure includes a category 4 LBT procedure and the second LBT procedure includes a category 2 LBT procedure.

Some examples of the method, apparatuses, and non-transitory computer-readable medium described herein may further include operations, features, means, or instructions for receiving, from the base station, an uplink configuration for the UE that indicates the set of subbands of the radio frequency spectrum band.

In some examples of the method, apparatuses, and non-transitory computer-readable medium described herein, receiving the uplink configuration may include operations, features, means, or instructions for receiving radio resource control signal indicating the uplink configuration, a downlink control information signal indicating the uplink configuration, or a combination thereof.

Some examples of the method, apparatuses, and non-transitory computer-readable medium described herein may further include operations, features, means, or instructions for receiving, from the base station, system information indicating, for each subband of the set of subbands, a result of an LBT procedure performed by the base station, where identifying that the transmission time interval may be during the COT may be based on the received system information.

In some examples of the method, apparatuses, and non-transitory computer-readable medium described herein, the system information includes a bitmap, each bit of the bitmap corresponding to the result of the LBT procedure for a respective one subband of the set of subbands.

DETAILED DESCRIPTION

Figure 1:
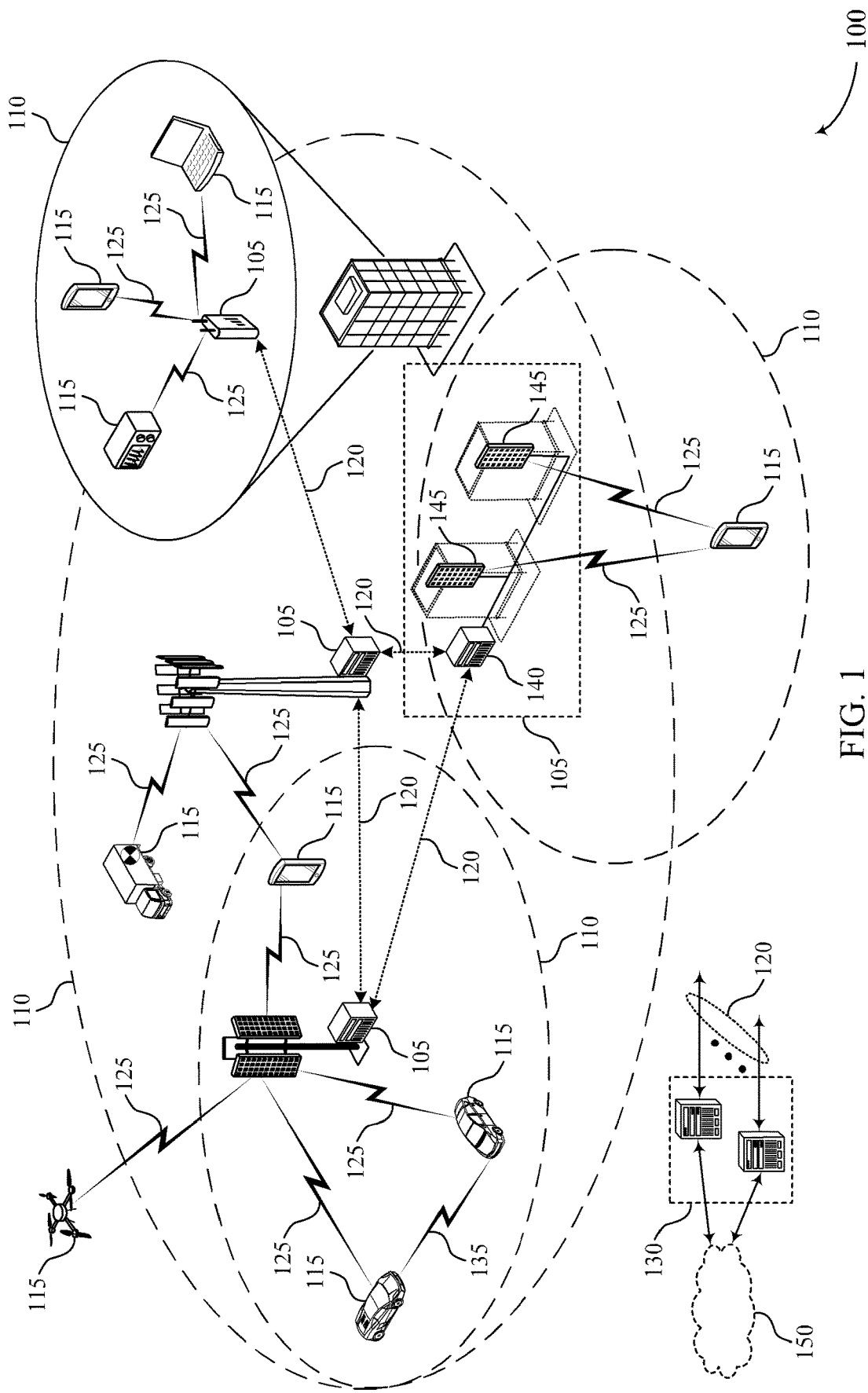
FIGS. 1 and 2 illustrate examples of wireless communications systems that support listen before talk (LBT) techniques for wireless communications systems in accordance with aspects of the present disclosure.

In some wireless communications systems (e.g., New Radio unlicensed (NR-U) systems, enhanced licensed assisted access (eLAA), etc.), a wireless device may perform a listen before talk (LBT) procedure to determine if a subband (e.g., a carrier, a channel, etc.) is unoccupied. For example, the wireless device (e.g., a user equipment (UE) or a base station) may perform energy sensing of a subband to identify if the subband is occupied (e.g., if another wireless device utilizing the subband for communications). If the LBT procedure is successful (e.g., the subband is clear), the wireless device may transmit communications on the subband. Alternatively, if the LBT procedure is unsuccessful (e.g., the subband is occupied), the wireless device may refrain from transmitting until a subsequent time (e.g., when the subband is clear). In some cases, a base station may perform a medium access procedure to secure a set of subbands for communications. For example, the base station may perform an LBT procedure on the set of subbands to determine if the set of subbands is occupied. In some examples, the base station may identify one or more subbands that are clear (e.g., the result of an LBT procedure is successful) and the base station may secure the channel for a period of time, such as a channel occupancy time (COT). Additionally or alternatively, the base station may identify one or more subbands that are occupied (e.g., the result of an LBT procedure is unsuccessful) and the base station may fail to obtain a COT for such subbands.

In some examples, the base station may schedule a UE for an uplink transmission that spans multiple LBT subbands (e.g., unlicensed frequencies). For example, a dynamic uplink grant or configured uplink transmission may indicate resources of a set of subbands (e.g., in a system with wideband operation including multiple LBT subbands). Additionally or alternatively, the UE may be scheduled or configured to transmit on multiple uplink carriers (e.g., using carrier aggregation across LBT subbands). However, the base station may have failed to secure a COT on each of the multiple subbands. For example, the base station may have obtained medium access (e.g., a COT) for some of the subbands and failed to obtain medium access for the other subbands. Techniques for implementing LBT procedures across multiple subbands may be desired.

According to the techniques described herein, a UE may implement one or more LBT schemes for multiple subbands of a radio frequency spectrum band. The UE may determine to transmit one or more uplink messages over a set of subbands during a transmission time interval (TTI), for example, based on an uplink configuration from a base station (e.g., radio resource control (RRC) signaling, downlink control information (DCI), etc.). In some examples, a base station may obtain medium access for a subset of the subbands (e.g., none of the subbands, a portion of the set of subbands, or all of the set of subbands) during a channel occupancy time (COT). The base station may indicate the obtained medium access for the subset of the subbands, for example, by transmitting system information (e.g., a bitmap indicating whether the base station has obtained a COT for each subband in the set of subbands).

The UE may determine which, if any, of the subbands are within the obtained medium access. For example, the UE may determine that one or more subbands are included in the COT for a TTI during which the UE wants to perform an uplink transmission. The UE may select an LBT procedure (e.g., a first type of LBT procedure or a second type of LBT procedure) to use for each subband based on the determination. Shorter LBT procedures may use less energy but be less accurate, whereas longer LBT procedures may consume more energy and increase interference for other devices, but increase accuracy. Subbands during the base station COT may allow for a shorter LBT procedure (e.g., due to a relatively lower likelihood that the channel is occupied by other devices). Such LBT procedures that account for the COT across multiple subbands may enable more efficient communications while maintaining a relatively low chance of interfering with other transmissions in the system.

Aspects of the disclosure are initially described in the context of wireless communications systems. Aspects of the disclosure are further described in the context of timelines that relate to LBT techniques for wireless communications systems. Aspects of the disclosure are further illustrated by and described with reference to apparatus diagrams, system diagrams, and flowcharts that relate to LBT techniques for wireless communications systems.

FIG. 1 illustrates an example of a wireless communications system 100 that supports LBT techniques for wireless communications systems in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/\Delta f_{max} \cdot N_f$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, the wireless communications system 100 may enable LBT procedures (e.g., the wireless communications system may be an example of an NR-U system or an eLAA system, among other examples of wireless communications systems). For example, a wireless device (e.g., a base stations 105 or a UE 115) may perform an LBT procedure to determine if an LBT subband (e.g., an LBT carrier, an LBT channel, etc.) is unoccupied. For example, the wireless device may perform energy sensing of a subband to identify if the subband is occupied (e.g., if another wireless device utilizing the subband for communications). If the LBT procedure is successful (e.g., the subband is clear), the wireless device may transmit communications on the subband. Alternatively, if the LBT procedure is unsuccessful (e.g., the subband is occupied), the wireless device may refrain from transmitting until a subsequent time. In some cases, a base station 105 may perform a medium access procedure to secure a set of subbands for communications. For example, the base station 105 may perform an LBT procedure on the set of subbands to determine if the set of subbands is occupied. In some examples, the base station 105 may identify one or more subbands that are clear (e.g., the result of an LBT procedure is successful) and the base station may secure the channel for a COT. Additionally or alternatively, the base station may identify one or more subbands that are occupied (e.g., the result of an LBT procedure is unsuccessful) and the base station may fail to obtain a COT for such subbands.

In some examples, the base station 105 may schedule a UE 115 for an uplink transmission that spans multiple subbands. For example, a dynamic uplink grant or configured uplink transmission may indicate resources of a set of subbands (e.g., in a system with wideband operation including multiple LBT subbands). Additionally or alternatively, the UE 115 may be scheduled or configured to transmit on multiple uplink carriers (e.g., using carrier aggregation across LBT subbands). However, the base station 105 may have failed to secure a COT on each of the multiple subbands. For example, the base station 105 may have obtained medium access (e.g., a COT) for some of the subbands and failed to obtain medium access for the other subbands. Techniques for implementing LBT procedures across multiple subbands may be desired.

According to the techniques described herein, a UE 115 may implement one or more LBT schemes for multiple subbands of a radio frequency spectrum band. The UE 115 may determine to transmit one or more uplink messages over a set of subbands during a TTI, for example, based on an uplink configuration from a base station (e.g., RRC signaling, DCI, etc.). In some examples, the base station 105 may obtain medium access for a subset of the subbands (e.g., none of the subbands, a portion of the set of subbands, or all of the set of subbands) during a COT. The base station 105 may indicate the obtained medium access for the subset of the subbands, for example, by transmitting system information (e.g., a bitmap indicating whether the base station 105 has obtained a COT for each subband in the set of subbands).

The UE 115 may determine which, if any, of the subbands are within the obtained medium access. For example, the UE 115 may determine that one or more subbands are included in the COT for a TTI during which the UE 115 wants to perform an uplink transmission (e.g., via a communication link 125). The UE 115 may select an LBT procedure (e.g., a first type of LBT procedure or a second type of LBT procedure) to use for each subband based on the determination. Shorter LBT procedures may use less energy but be less accurate, whereas longer LBT procedures may consume more energy and increase interference for other devices, but increase accuracy. Subbands during the COT of the base station 105 may allow for a shorter LBT procedure (e.g., due to a relatively lower likelihood that the channel is occupied by other devices). Such LBT procedures that account for the COT across multiple subbands may enable more efficient communications while maintaining a relatively low chance of interfering with other transmissions in the system.

Figure 2:
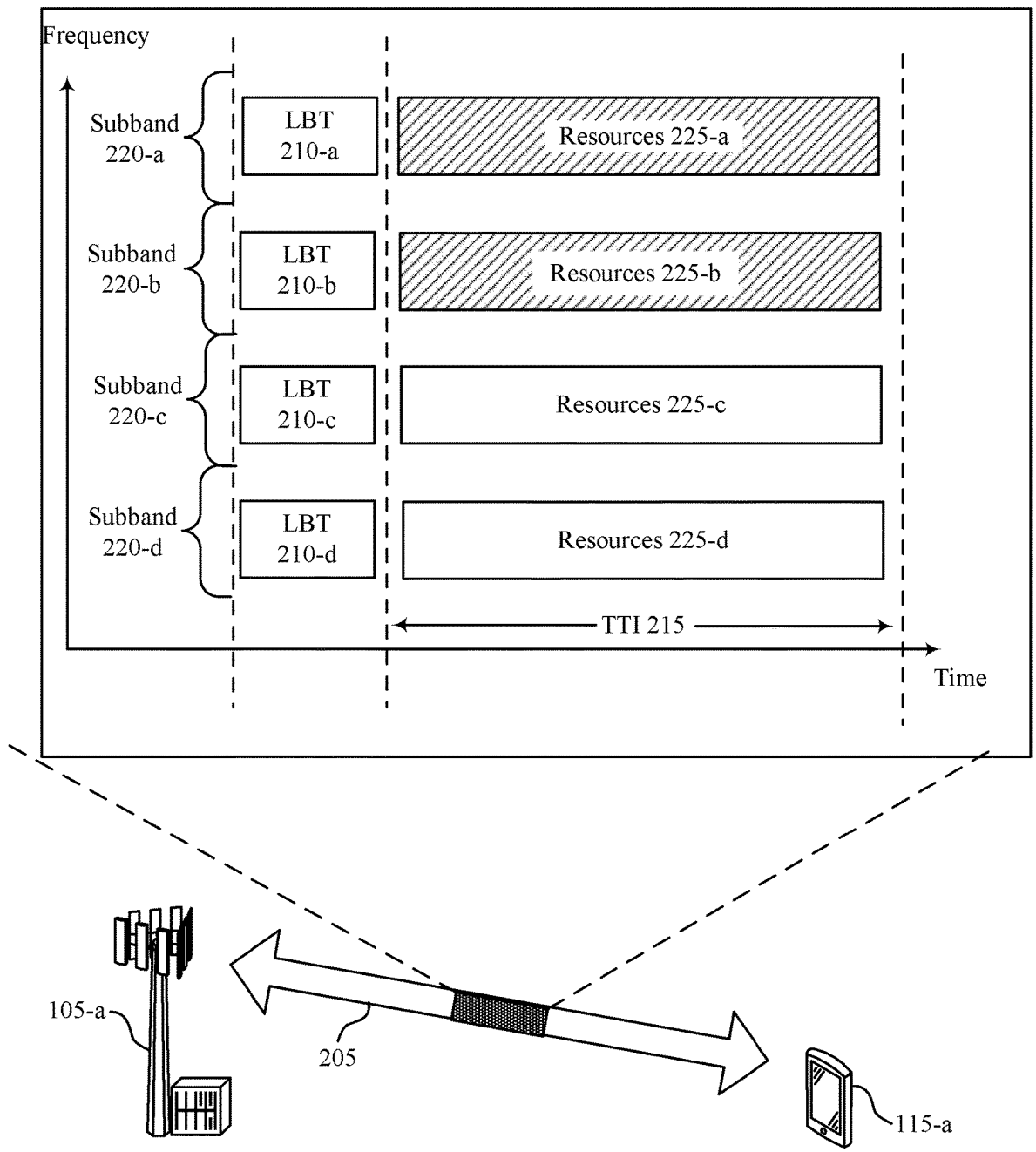

FIG. 2 illustrates an example of a wireless communications system 200 that supports LBT techniques for wireless communications systems in accordance with aspects of the present disclosure. In some examples, the wireless communications system 200 may implement aspects of wireless communication system 100. For example, the wireless communications system may include a base station 105-*a* and a UE 115-*a*, which may be examples of the corresponding devices described with reference to FIG. 1. Generally, the wireless communications system 200 illustrates an example of an LBT scheme that accounts for a COT of the base station 105-*a*. For example, the base station 105-*a* or the UE 115-*a* may perform one or more LBT procedures during the LBT periods 210 based on one or more subbands 220 being included in the COT or outside of the COT.

The base station 105-*a* may provide a coverage area (e.g., a coverage area 110) within which the UE 115-*a* and base station 105-*a* may perform communications via communication link 205, which may be an example of the communication links 125 as described with reference to FIG. 1. The communication link 205 may include one or more channels or carriers of an unlicensed spectrum. In the unlicensed spectrum, one or more channels may span or include multiple subbands 220, which may be supported by the base station 105-*a* for communications with the UE 115-*a*. An LBT procedure may be performed (e.g., by the base station 105-*a* or the UE 115-*a*) to monitor if a given subband 220 is occupied. For example, the base station may determine that a subband 220 is unoccupied and obtain a COT for the subband 220. The base station may communicate with the UE 115-*a* during the COT of the subband 220. As shown, the multiple subbands 220 may include subbands 220-*a*, 220-*b*, 220-*c*, and 220-*d*, although any quantity of subbands may be used.

The base station 105-*a* may schedule the UE 115-*a* with communications outside of the COT for the base station 105-*a*. For example, prior to performing an LBT procedure, the base station 105-*a* may configure the UE 115-*a* with an uplink transmission (e.g., an uplink message) over the subband 220-*a*. The UE 115-*a* may implement a first LBT procedure during the LBT period 210-*a* based on the uplink transmission being scheduled on the resources 225-*a* during a TTI 215 outside of the COT. For example, the UE 115-*a* may determine to perform a category 4 LBT procedure prior to transmitting on the resource 225-*a*. A category 4 LBT procedure may include a relatively longer monitoring window (e.g., a relatively larger energy detection period prior to transmitting the uplink transmission), which may ensure accurate estimation of whether the subband 220-*a* is occupied or unoccupied by communications of another device. In some examples, the base station 105-*a* may transmit DCI indicating the category 4 LBT procedure for the uplink transmission (e.g., the DCI may indicate a physical uplink shared channel (PUSCH) transmission a relatively large quantity of slots, such as K2 slots, from the DCI). Prior to the resources 225-*a* for the scheduled uplink transmission, the base station 105-*a* may perform an LBT procedure and indicate a result of the LBT procedure to the UE 115-*a*. For example, the base station 105-*a* may transmit system information (e.g., COT information, such as a COT structure indicator (SI)) indicating the COT of the base station 105-*a* and whether one or more communications over the subbands 220 are allowed during the COT based on the result of the LBT procedure at the base station 105-*a*.

In some examples, a result of the LBT procedure at the base station 105-*a* may be successful. In such examples, the UE 115-*a* may switch the LBT procedure performed during the LBT period 210-*a* to a category 2 LBT procedure prior to transmitting the uplink transmission. The category 2 LBT procedure may include a relatively smaller monitoring window (e.g., a relatively smaller energy detection period prior to transmitting the uplink transmission, such as 25 microseconds), which may result in more efficient communications (e.g., less power consumption, relatively higher likelihood of a successful LBT result, among other advantages). Alternatively, if the LBT procedure fails at the base station 105-*a*, the UE 115-*a* may maintain the LBT procedure during the LBT period 210-*a* as a category 4 LBT procedure. In some examples, the UE 115-*a* may use a first LBT procedure (e.g., a category 4 LBT procedure) for communications within the COT of the base station 105-*a* and a second LBT procedure (e.g., a category 2 LBT procedure) for communications outside of the COT (e.g., based on information associated with the COT received from the base station 105-*a*).

In some examples, the base station 105-*a* may schedule the UE 115-*a* with communications over multiple subbands 220. For example, the base station 105-*a* may configure an uplink transmission across the subbands 220 from the UE 115-*a* (e.g., via a dynamic uplink grant or a semi-persistent scheduling configuration). For example, the UE 115-*a* may perform carrier aggregation for the uplink transmission on multiple uplink carriers. The UE 115-*a* may identify resources 225 during a TTI 215 for the uplink transmission based on the configuration. The UE 115-*a* may perform one or more LBT procedures during the LBT periods 210 for the uplink transmission across the subbands 220. For example, the UE 115-*a* may randomly select one of the subbands 220 to perform a first LBT procedure (e.g., category 4 LBT during the LBT period 210-*c* on the subband 220-*c*) and the UE 115-*a* may perform a second LBT procedure on the remaining subbands 220 of the uplink transmission based on one or more thresholds being satisfied. The one or more thresholds may include that the UE is scheduled or configured to transmit on each of the subbands 220, that an uplink grant for the uplink transmission indicates the first LBT procedure (e.g., category 4 LBT) and a same PUSCH starting position across the set of subbands 220, that the uplink transmission (or transmissions) are configured to start transmission on the same time across the set of subbands 220, that the set of subbands 220 (e.g., carriers) are grouped in accordance with one or more different radio access technologies (e.g., Wi-Fi channel bonding rules), or any combination thereof.

In some cases, the base station 105-*a* may have failed to secure a COT on each of the multiple subbands 220. For example, the base station 105-*a* may have obtained a COT for some of the subbands 220 (e.g., subband 220-*a* and subband 220-*b*) and failed to obtain medium access for other subbands 220 (e.g., subband 220-*c* and subband 220-*d*). Devices of the wireless communications system 200 (e.g., the UE 115-*a*) may implement one or more LBT schemes as described herein for LBT procedures over multiple subbands 220 based on the COT of the base station 105-*a*.

As an illustrative example of a first LBT scheme, the base station 105-*a* may obtain a COT for one or more of the subbands 220. The base station 105-*a* may indicate the COT, the subbands included in the COT, the subbands outside of the COT, or a combination thereof to the UE 115-*a*. For example, the base station 105-*a* may transmit system information (e.g., COT-SI) to the UE 115-*a*. In some examples, the system information may include a bitmap corresponding to the subbands 220. For example, the bitmap may include a bit associated with each subband 220 (e.g., a bit for the subband 220-*a* indicating whether the TTI 215 for the resources 225-*a* are included in the COT, a bit for the subband 220-*b* indicating whether the TTI 215 for the resources 225-*b* are included in the COT, and so on).

The UE 115-*a* may identify the COT and determine whether a set of the subbands 220 are included in the COT of the base station 105-*a*. For example, the UE 115-*a* may determine that all of the subbands 220 are included in the COT. In such examples, the UE 115-*a* may use a second LBT procedure for each of LBT periods 210. For example, the UE 115-*a* may perform a category 2 LBT procedure in each of the LBT periods 210 based on each of the subbands 220 being included in the COT (e.g., the base station 105-*a* may have obtained medium access over a channel including the TTI 215 of the uplink transmission and each of the resources 225). Such a procedure may enable relatively efficient communications at the UE 115-*a* (e.g., reduced power consumption). In some other examples, the UE 115-*a* may determine that all of the subbands 220 are outside of the COT. In such examples, the UE 115-*a* may perform a first LBT procedure for each of the LBT periods 210 (e.g., a category 4 LBT procedure) based on the determination. Such a procedure may enable relatively accurate sensing of the subbands 220, which may mitigate the likelihood of interference with communications from other devices. In yet other examples, the UE 115-*a* may determine that a first set of subbands 220 are included in the COT (e.g., the subband 220-*a* and the subband 220-*b*) and a second set of subbands 220 are outside of the COT (e.g., the subband 220-*c* and the subband 220-*d*). In such examples, the UE 115-*a* may refrain from performing an LBT procedure, cancel the transmission during the TTI 215, or both. By refraining from performing the LBT procedure or refraining from transmitting during the TTI 215, the UE 115-*a* may ensure low processing overhead at the UE 115-*a* and refrain from interfering with other transmissions in the wireless communications system 200.

Figure 3A:
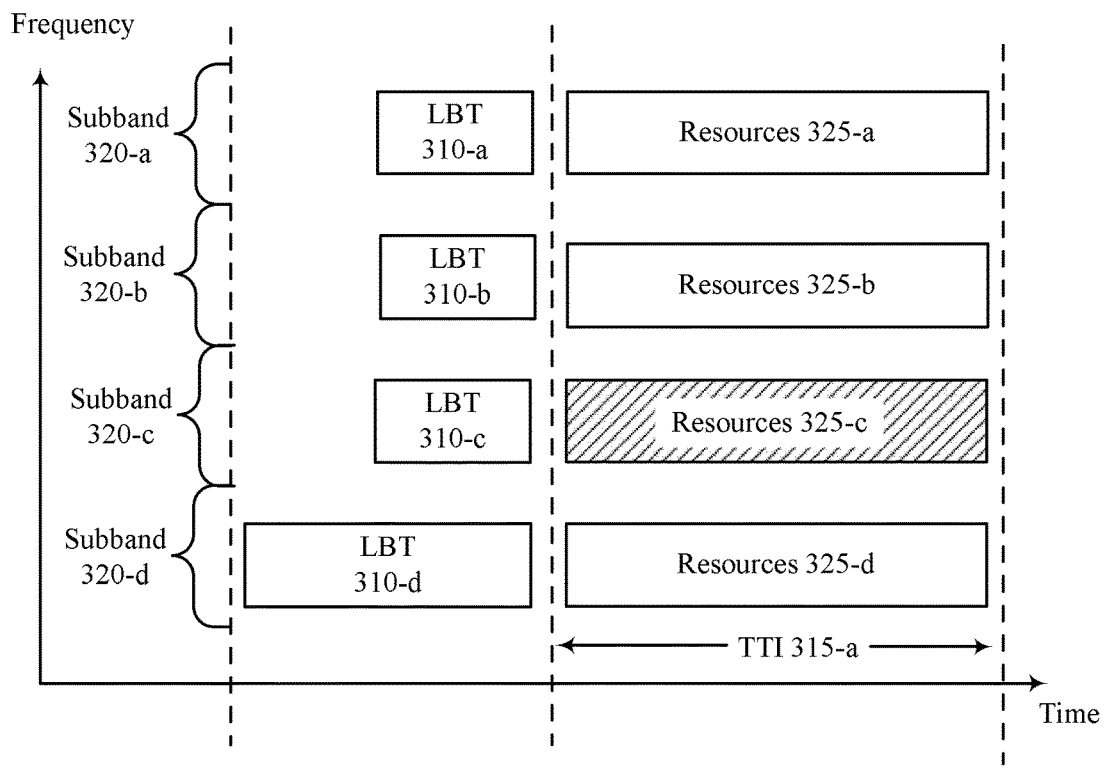
FIGS. 3-5 illustrate examples of timelines that support LBT techniques for wireless communications systems in accordance with aspects of the present disclosure.
Figure 3B:
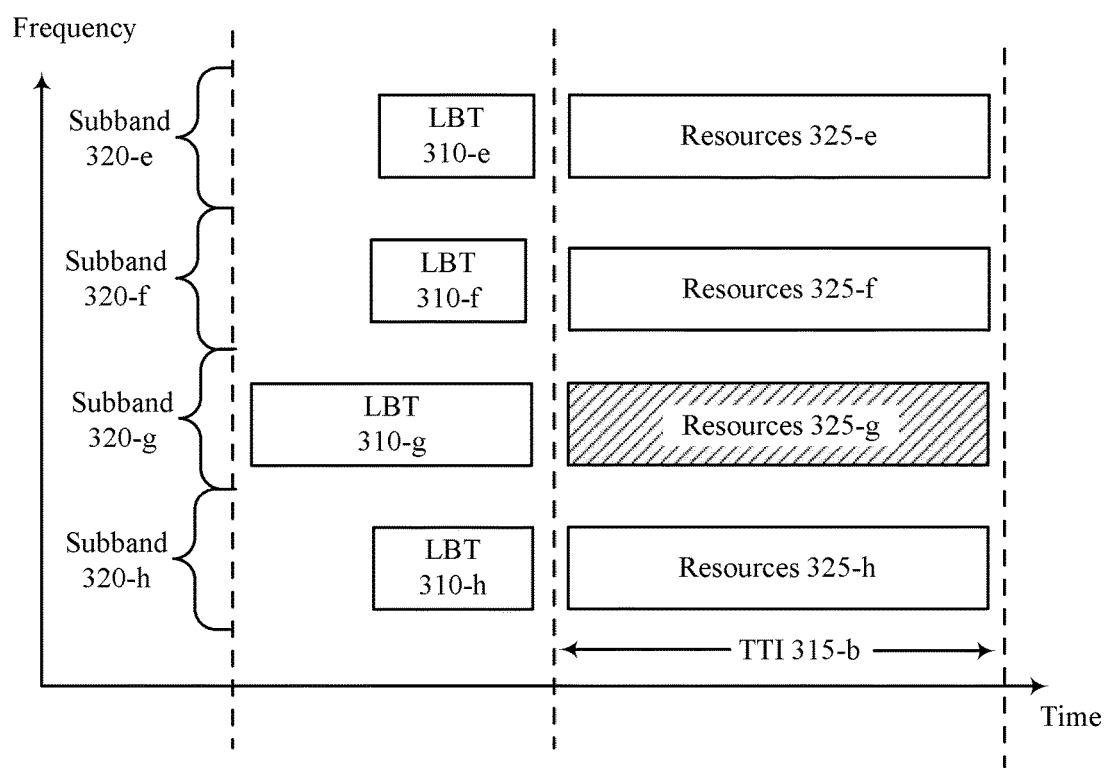

FIGS. 3A and 3B illustrate examples of a timeline 300-*a* and a timeline 300-*b*, respectively, that support LBT techniques for wireless communications systems in accordance with aspects of the present disclosure. In some examples, the timelines 300 may implement aspects of wireless communications systems 100 and 200. For example, the timelines 300-*a* and 300-*b* may include LBT periods 310, TTIs 315, subbands 320, and resources 325, which may be examples of the corresponding elements as described with reference to FIGS. 1 and 2.

Generally, the timeline 300-*a* and the timeline 300-*b* may illustrate examples of a second LBT scheme for performing one or more LBT procedures across multiple subbands 320 as described herein. The second LBT scheme may enable a wireless device (e.g., a UE 115 or a base station 105) to identify a set of subbands 320 that are included in a COT of a base station, and perform the one or more LBT procedures during the LBT periods 310 in accordance with the set of subbands 320 being included in the COT.

The wireless device may identify a communication over the resources 325. For example, the wireless device may identify an uplink transmission scheduled over multiple subbands 320, such as a set of subbands 320 including subband 320-*a*, subband 320-*b*, subband 320-*c*, and subband 320-*d* during the TTI 315-*a*. In some examples, the wireless device may determine that each of the subbands 320 are included in the COT (e.g., a base station 105 has medium access over each of the subbands 320 during a COT that includes the TTI 315-*a*). In such examples, the wireless device may implement a second LBT procedure during each of the LBT periods 310. For example, the wireless device may monitor the subbands 320 to determine if each subband 320 is occupied in accordance with the second LBT procedure (e.g., each of the LBT periods 310-*a*, 310-*b*, 310-*c*, and 310-*d* may be relatively short monitoring durations prior to the resources 325-*a*, 325-*b*, 325-*c*, and 325-*d*). If the wireless device determines that each of the subbands are clear (e.g., a result of the second LBT procedure on each subband indicates that the subbands are not occupied), the wireless device may transmit the uplink transmission using the resources 325.

In some examples of the second LBT scheme, the wireless device may determine that at least one of the subbands 320 are outside of the COT of the base station. For example, the wireless device may determine that all of the subbands 320-*a*, 320-*b*, 320-*c*, and 320-*d* are outside of the COT. Additionally or alternatively, the wireless device may determine that one or more of the subbands 320 are included in the COT (e.g., the base station has obtained medium access including the resources 325-*c* of the subband 320-*c* as shown in the timeline 300-*a* and the resources 325-*g* of the subband 320-*g* as shown in the timeline 300-*b*) and that one or more of the subbands are outside of the COT (e.g., the base station failed to obtain a COT for the subbands 320-*a*, 320-*b*, and 320-*d* as shown in the timeline 300-*a*). The wireless device may implement one or more LBT procedures based on determining that at least one of the subbands 320 are outside of the COT. For example, the wireless device may select a subband 320 of the set of subbands 320 associated with the uplink transmission. In some examples, the selection of the subband 320 may be performed randomly based on determining that at least one of the subbands 320 are outside of the COT. The wireless device may perform a first LBT procedure for the selected subband 320 and a second LBT procedure for the other subbands 320 associated with the uplink transmission across the set of subbands 320. Such an LBT scheme may result in more efficient communications across multiple subbands 320 (e.g., the wireless device may have a reduced likelihood of medium access failure).

As an illustrative example, the wireless device may select the subband 320-*d* for performing the first LBT procedure in the timeline 300-*a*. As shown, the TTI 315-*a* of the subband 320-*c* may be included in a COT of a base station. The wireless device may perform the first LBT procedure (e.g., a category 4 LBT procedure) for the duration of the LBT period 310-*d* (e.g., a relatively longer monitoring period) based on selecting the subband 320-*d*. The wireless device may perform the second LBT procedure for the remaining subbands 320 (e.g., the subbands 320 of the uplink transmission that were not selected). For example, the wireless device may perform a category 2 LBT procedure for the duration of the LBT period 310-*a* for the subband 320-*a*, the duration of the LBT period 310-*b* for the subband 320-*b*, and the duration of the LBT period 310-*c* for the subband 320-*c*. The wireless device may transmit, or refrain from transmitting, the uplink transmission based on a result of each of the LBT procedures. For example, if the wireless device determines that each of the subbands 320 are clear (e.g., a result of the LBT procedures on each subband 320 indicates that the subbands 320 are unoccupied), the wireless device may transmit the uplink transmission over the resources 325 during the TTI 315-*a*. Alternatively, if the wireless device determines that an LBT procedure of one or more of the subbands 320 was unsuccessful, the wireless device may wait until a subsequent TTI 315 to attempt to transmit the uplink transmission (e.g., the wireless device may wait until all of the LBT procedures are clear for a given TTI 315).

As another illustrative example, the wireless device may select the subband 320-g for performing the first LBT procedure in the timeline 300-b. As shown, the TTI 315-b of the subband 320-g may be included in a COT of a base station. The wireless device may perform the first LBT procedure (e.g., a category 4 LBT procedure) for the duration of the LBT period 310-g (e.g., a relatively longer monitoring period) based on selecting the subband 320-g. The wireless device may perform the second LBT procedure for the remaining subbands 320 (e.g., the subbands 320 of the uplink transmission that were not selected). For example, the wireless device may perform a category 2 LBT procedure for the duration of the LBT period 310-e for the subband 320-e, the duration of the LBT period 310-f for the subband 320-f, and the duration of the LBT period 310-h for the subband 320-h. The wireless device may transmit, or refrain from transmitting, the uplink transmission based on a result of each of the LBT procedures. For example, if the wireless device determines that each of the subbands 320 are clear (e.g., a result of the LBT procedures on each subband 320 indicates that the subbands 320 are unoccupied), the wireless device may transmit the uplink transmission over the resources 325 during the TTI 315-b. Alternatively, if the wireless device determines that an LBT procedure of one or more of the subbands 320 was unsuccessful, the wireless device may wait until a subsequent TTI 315 to attempt to transmit the uplink transmission (e.g., the wireless device may wait until all of the LBT procedures are clear for a given TTI 315).

Figure 4A:
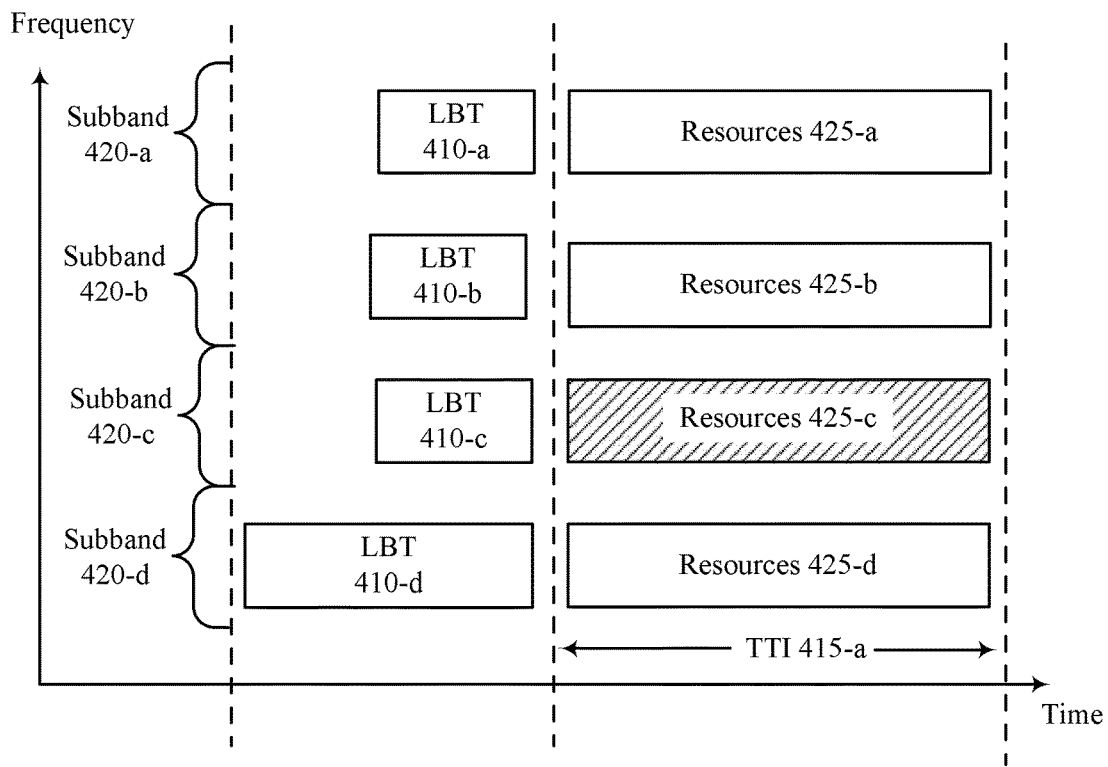
Figure 4B:
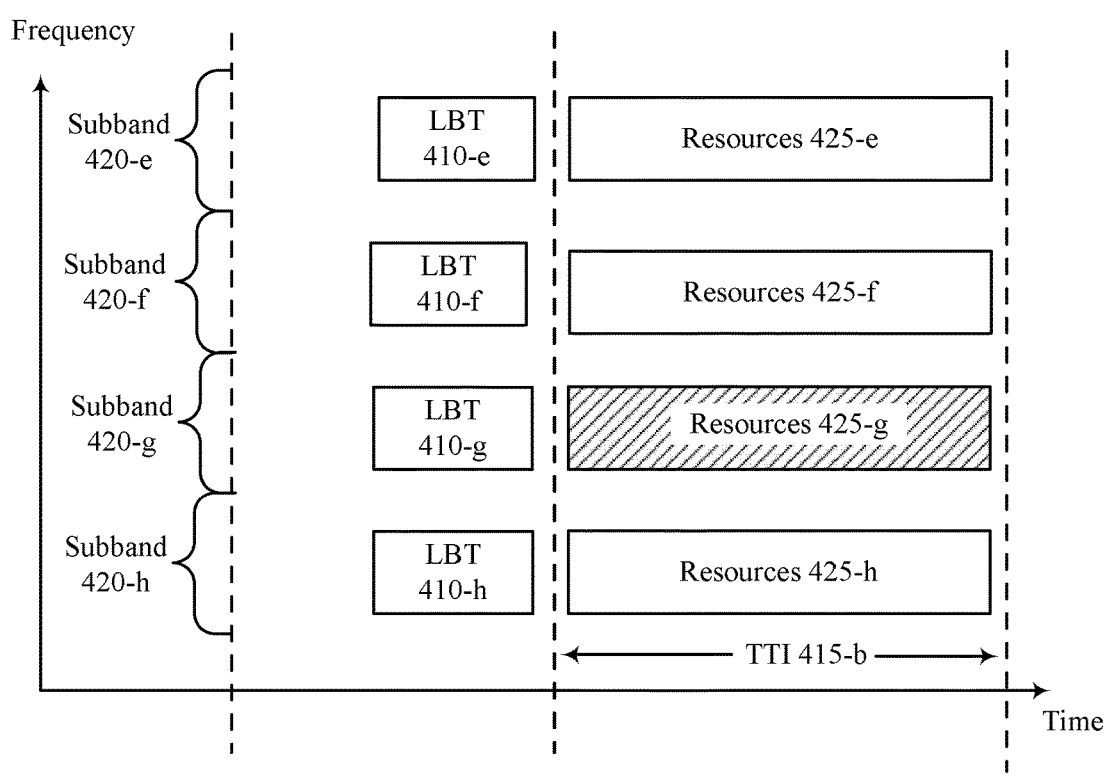

FIGS. 4A and 4B illustrate examples of a timeline 400-a and a timeline 400-b that support LBT techniques for wireless communications systems in accordance with aspects of the present disclosure. In some examples, the timelines 400 may implement aspects of wireless communications systems 100 and 200, the timelines 300, or any combination thereof. For example, the timelines 400-a and 400-b may include LBT periods 410, TTIs 415, subbands 420, and resources 425, which may be examples of the corresponding elements as described with reference to FIGS. 1-3.

Generally, the timeline 400-a and the timeline 400-b may illustrate examples of a third LBT scheme for performing one or more LBT procedures across multiple subbands 420 as described herein. The third LBT scheme may enable a wireless device (e.g., a UE 115 or a base station 105) to identify a set of subbands 420 that are included in a COT of a base station, and perform the one or more LBT procedures during the LBT periods 410 in accordance with the set of subbands 420 being included in the COT.

The wireless device may identify a communication over the resources 425. For example, the wireless device may identify an uplink transmission scheduled over multiple subbands 420, such as a set of subbands 420 including subband 420-a, subband 420-b, subband 420-c, and subband 420-d during the TTI 415-a. In some examples, the wireless device may be configured with the uplink transmission as described herein with reference to FIG. 3.

The wireless device may identify a set of subbands 420 of the multiple subbands 420 that are included in a COT of a base station (e.g., via an indication from the base station as described with reference to FIG. 3). For example, the wireless device may identify that none of the subbands 420 associated with the uplink transmission are included in the COT, all of the subbands 420 associated with the uplink transmission are included in the COT, or a first set of subbands 420 are included in the COT and a second set of subbands 420 are outside of the COT. As an illustrative example, the first set of subbands 420 that are included in the COT may include the subband 420-c in the timeline 400-a (e.g., a base station 105 has medium access over the subband 420-c during a COT that includes the TTI 415-a). As another illustrative example, the first set of subbands 420 that are included in the COT may include the subband 420-g in the timeline 400-b (e.g., a base station 105 has medium access over the subband 420-g during a COT that includes the TTI 415-b).

The wireless device may implement one or more LBT procedures based on identifying a set of subbands 420 of the multiple subbands 420 that are included in the COT. For example, the wireless device may select one of the subbands 420 associated with the uplink transmission as an anchor subband 420 (e.g., an anchor channel). In some examples, the wireless device may select the anchor subband 420 randomly. The wireless device may perform one or more LBT procedures during the LBT periods 410 based on the selected anchor subband 420. For example, the wireless device may identify whether the anchor subband 420 is included in a COT. If the anchor subband 420 is outside of the COT, the wireless device may perform a first LBT procedure (e.g., a category 4 LBT procedure). Alternatively, if the anchor subband 420 is included in the COT, the wireless device may perform a second LBT procedure (e.g., a category 2 LBT procedure).

As an illustrative example, the wireless device may select the subband 420-d as the anchor subband 420 in the timeline 400-a. As shown, the TTI 415-a of the subband 420-c may be included in a COT of a base station (e.g., the resources 425-c may be included in the COT). The wireless device may determine whether the selected anchor subband 420 (e.g., the subband 420-d) is within a COT of the base station. For example, the wireless device may identify that the selected anchor subband 420-d in the timeline 400-a includes resources 425-d that are outside of the COT of the base station (e.g., the base station may fail to obtain a COT for the subband 420-d during the TTI 415-a). The wireless device may perform a first LBT procedure (e.g., a category 4 LBT procedure) for the duration of the LBT period 410-d (e.g., a relatively longer monitoring period) based on identifying that the anchor subband 420-d is outside of the COT. Additionally or alternatively, the wireless device may perform a second LBT procedure for the remaining subbands 420 (e.g., the subbands 420 of the uplink transmission that were not selected as an anchor subband 420). For example, the wireless device may perform a category 2 LBT procedure (e.g., a relatively shorter monitoring period) for the duration of the LBT period 410-a for the subband 420-a, the duration of the LBT period 410-b for the subband 420-b, and the duration of the LBT period 410-c for the subband 420-c.

As another illustrative example, the wireless device may select the subband 420-g as the anchor subband 420 in the timeline 400-b. As shown, the TTI 415-b of the subband 420-g may be included in a COT of a base station (e.g., the resources 425-g may be included in the COT). The wireless device may determine whether the selected anchor subband 420 (e.g., the subband 420-g) is within a COT of the base station. For example, the wireless device may identify that the selected anchor subband 420-g in the timeline 400-b includes resources 425-g that are within the COT of the base station (e.g., the base station may obtain a COT for the subband 420-*g* during the TTI 415-*b*). The wireless device may perform the second LBT procedure (e.g., a category 2 LBT procedure) for the duration of the LBT period 410-*g* (e.g., a relatively shorter monitoring period) based on identifying that the anchor subband 420-*g* is within the COT. Additionally or alternatively, the wireless device may perform the second LBT procedure for the remaining subbands 420 (e.g., the subbands 420 of the uplink transmission that were not selected as an anchor subband 420). For example, the wireless device may perform a category 2 LBT procedure for the duration of the LBT period 410-*e* for the subband 420-*e*, the duration of the LBT period 410-*f* for the subband 420-*f*, and the duration of the LBT period 410-*h* for the subband 420-*h*.

In some examples of the third LBT scheme described with reference to FIGS. 4A and 4B, the wireless device may transmit, or refrain from transmitting, the uplink transmission based on a result of each of the LBT procedures. For example, if the wireless device determines that each of the subbands 420 are clear (e.g., a result of the LBT procedures on each subband 420 indicates that the subbands 420 are unoccupied), the wireless device may transmit the uplink transmission over the resources 425 during the TTI 415-*a*. Alternatively, if the wireless device determines that an LBT procedure of one or more of the subbands 420 was unsuccessful, the wireless device may wait until a subsequent TTI 415 to attempt to transmit the uplink transmission (e.g., the wireless device may wait until all of the LBT procedures are clear for a given TTI 415).

Figure 5A:
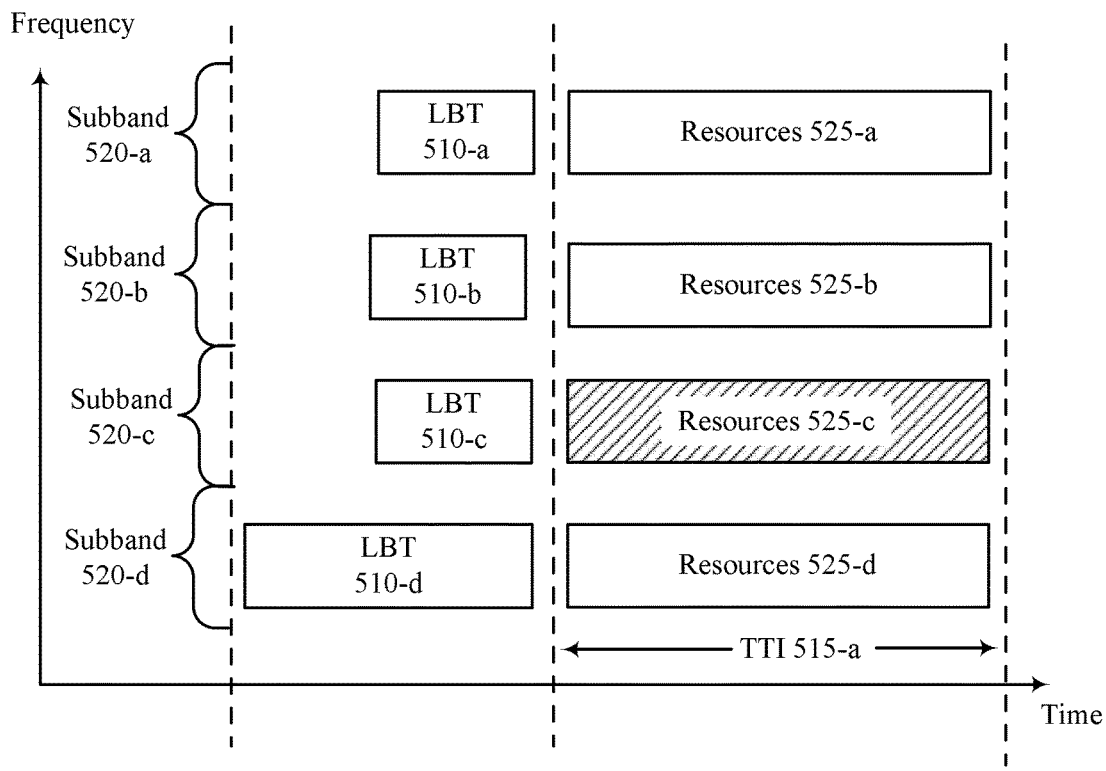
Figure 5B:
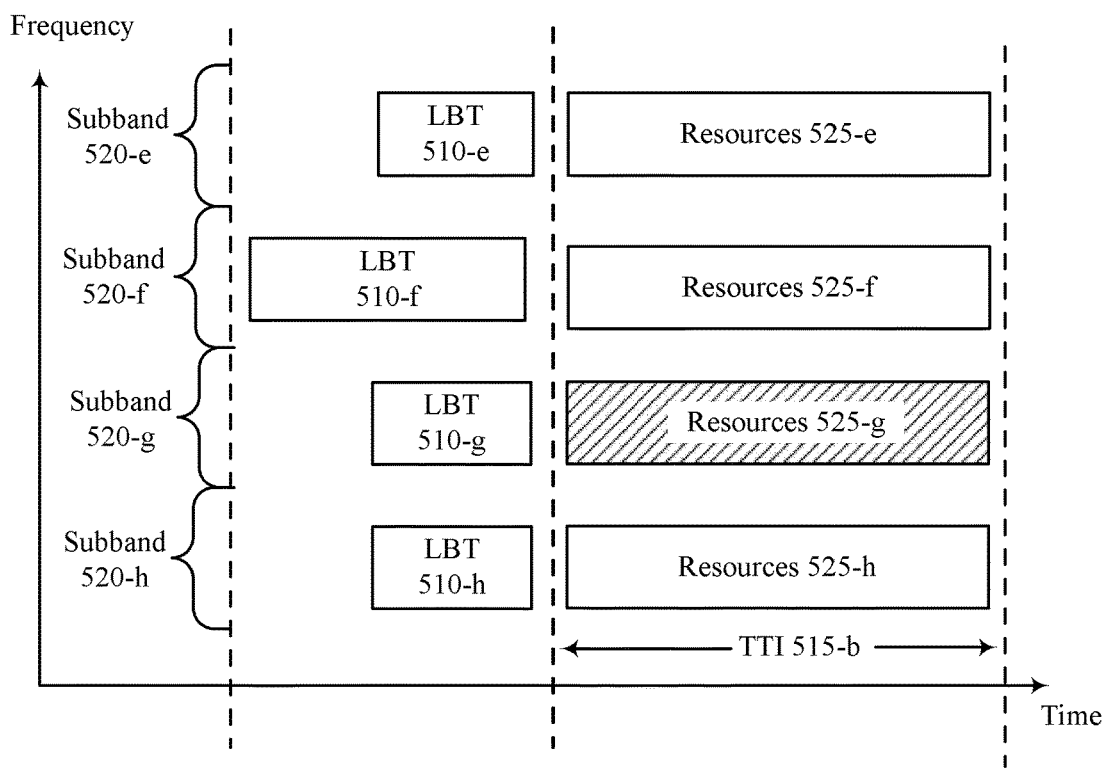

FIG. 5 illustrates examples of a timeline 500-*a* and a timeline 500-*b*, respectively, that support LBT techniques for wireless communications systems in accordance with aspects of the present disclosure. In some examples, the timelines 500 may implement aspects of wireless communications systems 100 and 200, the timelines 300, the timelines 400, or any combination thereof. For example, the timelines 500-*a* and 500-*b* may include LBT periods 510, TTIs 515, subbands 520, and resources 525, which may be examples of the corresponding elements as described with reference to FIGS. 1-4.

Generally, the timeline 500-*a* and the timeline 500-*b* may illustrate examples of a fourth LBT scheme for performing one or more LBT procedures across multiple subbands 520 as described herein. The fourth LBT scheme may enable a wireless device (e.g., a UE 115 or a base station 105) to identify a set of subbands 520 that are included in a COT of a base station, and perform the one or more LBT procedures during the LBT periods 510 in accordance with the set of subbands 520 being included in the COT.

The wireless device may identify a communication over the resources 525. For example, the wireless device may identify an uplink transmission scheduled over multiple subbands 520, such as a set of subbands 520 including subband 520-*a*, subband 520-*b*, subband 520-*c*, and subband 520-*d* during the TTI 515-*a*. In some examples, the wireless device may determine that each of the subbands 520 are included in the COT (e.g., a base station 105 has medium access over each of the subbands 520 during a COT that includes the TTI 515-*a*). In such examples, the wireless device may implement a second LBT procedure (e.g., a category 2 LBT procedure) during each of the LBT periods 510. For example, the wireless device may monitor the subbands 520 to determine if each subband 520 is occupied in accordance with the second LBT procedure (e.g., each of the LBT periods 510-*a*, 510-*b*, 510-*c*, and 510-*d* may be relatively short monitoring durations prior to the resources 525-*a*, 525-*b*, 525-*c*, and 525-*d*). If the wireless device determines that each of the subbands are clear (e.g., a result of the second LBT procedure on each subband indicates that the subbands are not occupied), the wireless device may transmit the uplink transmission using the resources 525.

In some examples of the fourth LBT scheme, the wireless device may determine that at least one of the subbands 520 are outside of the COT of the base station. For example, the wireless device may determine that all of the subbands 520-*a*, 520-*b*, 520-*c*, and 520-*d* are outside of the COT. Additionally or alternatively, the wireless device may determine that a first set of the subbands 520 are included in the COT (e.g., the base station has obtained medium access including the resources 525-*c* of the subband 520-*c* as shown in the timeline 500-*a* and the resources 525-*g* of the subband 520-*g* as shown in the timeline 500-*b*) and that a second set of the subbands are outside of the COT (e.g., the base station failed to obtain a COT for the subbands 520-*a*, 520-*b*, and 520-*d* as shown in the timeline 500-*a*).

The wireless device may implement one or more LBT procedures based on determining that the first set of the subbands 520 are included in the COT. For example, the wireless device may select a subband 520 of the second set of subbands 520 (e.g., the subbands 520 that are outside of the COT). In some examples, the selection of the subband 520 may be performed randomly within the second set of subbands 520 that are outside of the COT. The wireless device may perform a first LBT procedure (e.g., a category 4 LBT procedure) for the selected subband 520 and a second LBT procedure (e.g., a category 2 LBT procedure) for the other subbands 520 associated with the uplink transmission across the multiple subbands 520.

As an illustrative example, the wireless device may select the subband 520-*d* for performing the first LBT procedure in the timeline 500-*a*. As shown, the TTI 515-*a* of the subband 520-*c* may be included in a COT of a base station and the TTI 515-*a* of the subbands 520-*a*, 520-*b*, and 520-*d* may be outside of the COT. The wireless device may select the subband 520-*d* randomly from the subbands 520-*a*, 520-*b*, and 520-*d* that are outside of the COT. The wireless device may perform the first LBT procedure (e.g., a category 4 LBT procedure) for the duration of the LBT period 510-*d* (e.g., a relatively longer monitoring period) based on selecting the subband 520-*d*. The wireless device may perform the second LBT procedure for the remaining subbands 520 (e.g., the subbands 520 of the uplink transmission that were not selected). For example, the wireless device may perform a category 2 LBT procedure for the duration of the LBT period 510-*a* for the subband 520-*a*, the duration of the LBT period 510-*b* for the subband 520-*b*, and the duration of the LBT period 510-*d* for the subband 520-*d*. The wireless device may transmit, or refrain from transmitting, the uplink transmission based on a result of each of the LBT procedures. For example, if the wireless device determines that each of the subbands 520 are clear (e.g., a result of the LBT procedures on each subband 520 indicates that the subbands 520 are unoccupied), the wireless device may transmit the uplink transmission over the resources 525 during the TTI 515-*a*. Alternatively, if the wireless device determines that an LBT procedure of one or more of the subbands 520 was unsuccessful, the wireless device may wait until a subsequent TTI 515 to attempt to transmit the uplink transmission (e.g., the wireless device may wait until all of the LBT procedures are clear for a given TTI 515).

As another illustrative example, the wireless device may select the subband 520-*f* for performing the first LBT procedure in the timeline 500-*a*. As shown, the TTI 515-*a* of the subband 520-*g* may be included in a COT of a base station and the TTI 515-*a* of the subbands 520-*e*, 520-*f*, and 520-*h* may be outside of the COT. The wireless device may select the subband 520-*f* randomly from the subbands 520-*e*, 520-*f*, and 520-*h* that are outside of the COT. The wireless device may perform the first LBT procedure (e.g., a category 4 LBT procedure) for the duration of the LBT period 510-*f* (e.g., a relatively longer monitoring period) based on selecting the subband 520-*f*. The wireless device may perform the second LBT procedure for the remaining subbands 520 (e.g., the subbands 520 of the uplink transmission that were not selected). For example, the wireless device may perform a category 2 LBT procedure for the duration of the LBT period 510-*e* for the subband 520-*e*, the duration of the LBT period 510-*g* for the subband 520-*g*, and the duration of the LBT period 510-*h* for the subband 520-*h*. The wireless device may transmit, or refrain from transmitting, the uplink transmission based on a result of each of the LBT procedures. For example, if the wireless device determines that each of the subbands 520 are clear (e.g., a result of the LBT procedures on each subband 520 indicates that the subbands 520 are unoccupied), the wireless device may transmit the uplink transmission over the resources 525 during the TTI 515-*a*. Alternatively, if the wireless device determines that an LBT procedure of one or more of the subbands 520 was unsuccessful, the wireless device may wait until a subsequent TTI 515 to attempt to transmit the uplink transmission (e.g., the wireless device may wait until all of the LBT procedures are clear for a given TTI 515).

Figure 6:
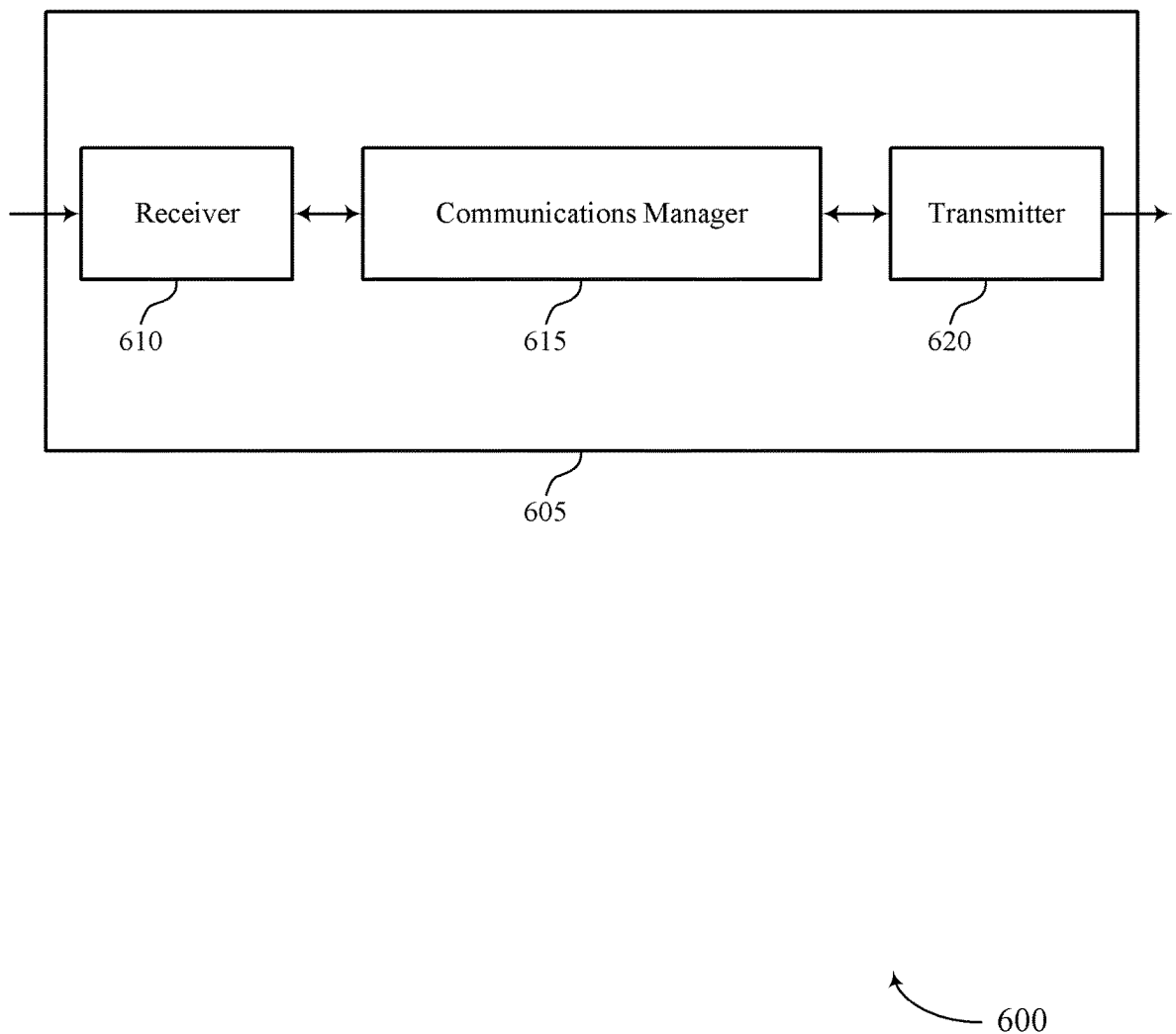
FIGS. 6 and 7 show block diagrams of devices that support LBT techniques for wireless communications systems in accordance with aspects of the present disclosure.

FIG. 6 shows a block diagram 600 of a device 605 that supports LBT techniques for wireless communications systems in accordance with aspects of the present disclosure. The device 605 may be an example of aspects of a UE 115 as described herein. The device 605 may include a receiver 610, a communications manager 615, and a transmitter 620. The device 605 may also include one or more processors, memory coupled with the one or more processors, and instructions stored in the memory that are executable by the one or more processors to enable the one or more processors to perform the LBT features discussed herein. Each of these components may be in communication with one another (e.g., via one or more buses).

The receiver 610 may receive information such as packets, user data, or control information associated with various information channels (e.g., control channels, data channels, and information related to LBT techniques for wireless communications systems, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine to transmit, to a base station during a transmission time interval, an uplink message on a set of subbands of a radio frequency spectrum band, identify that the transmission time interval is during a COT for the base station for a first set of subbands of the set of subbands, perform, for each subband of the set of subbands, an LBT procedure that is selected for each subband based on identifying that the transmission time interval is during the COT for the base station, and transmit the uplink message on the set of subbands based on a result of the performed LBT procedure for each subband of the set of subbands. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the communications manager 615 as described herein may be implemented to realize one or more potential advantages. For example, performing one or more LBT procedures for multiple subbands based on determining that a first set of the subbands (e.g., all of the subbands, none of the subbands, a portion of the subbands) are included in a COT of a base station may result in relatively efficient communications. For example, such LBT procedures that account for the COT across multiple subbands may enable more efficient communications while maintaining a relatively low chance of interfering with other transmissions in the system.

Additionally or alternatively, the communications manager 615 may be implemented to realize one or more potential advantages at the processor level. For example, the communications manager 615 may be enabled to perform a relatively more efficient LBT procedure (e.g., a category 2 LBT procedure) for one or more subbands of multiple subbands for an uplink transmission. Such LBT procedures may result in reduced processing overhead and power consumption at the processor of the UE, increase a likelihood of successful medium access, or both, among other advantages.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
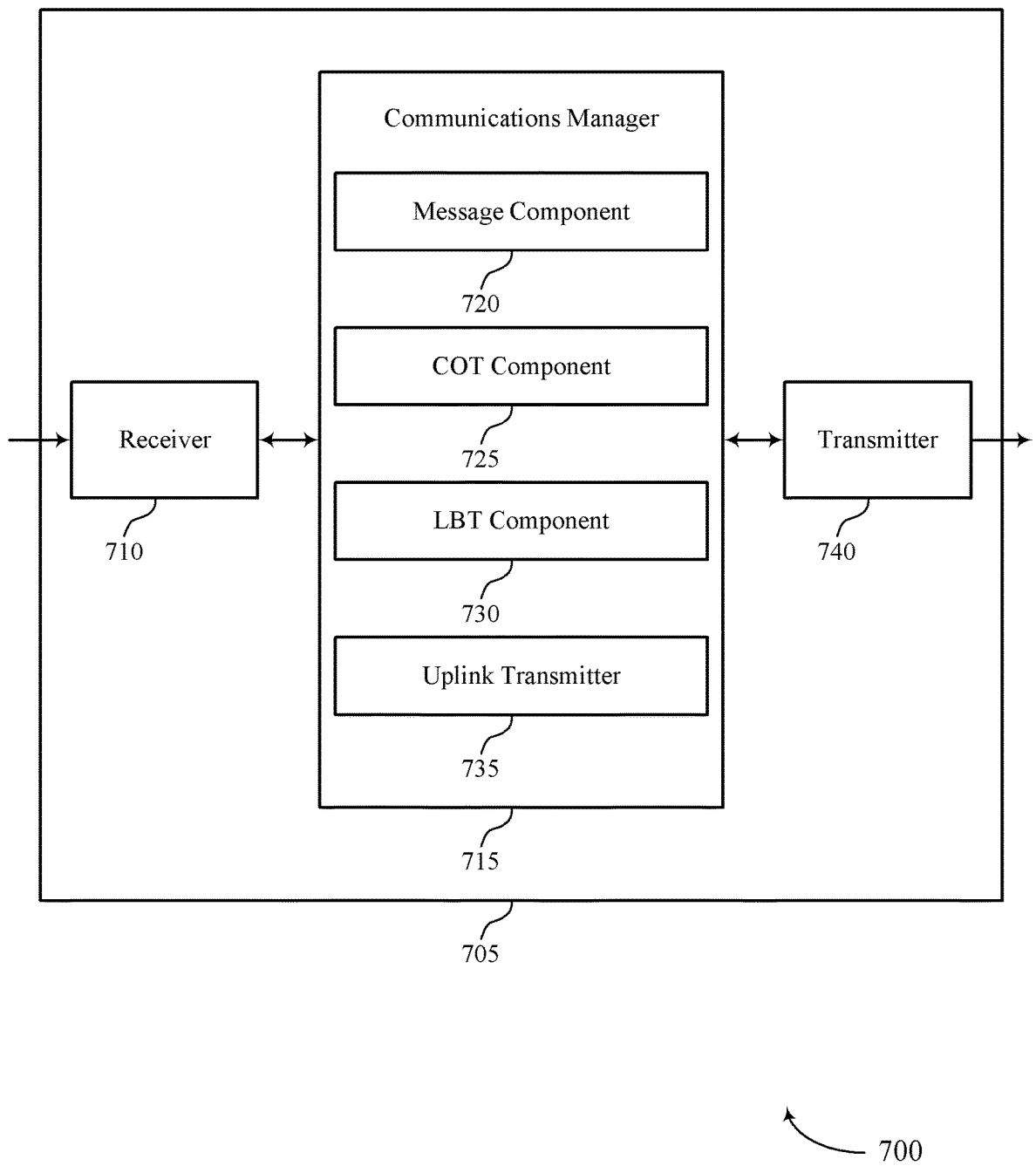

FIG. 7 shows a block diagram 700 of a device 705 that supports LBT techniques for wireless communications systems in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to LBT techniques for wireless communications systems, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a message component 720, a COT component 725, an LBT component 730, and an uplink transmitter 735. The communications manager 715 may be an example of aspects of the communications manager 910 described herein.

The message component 720 may determine to transmit, to a base station during a transmission time interval, an uplink message on a set of subbands of a radio frequency spectrum band.

The COT component 725 may identify that the transmission time interval is during a COT for the base station for a first set of subbands of the set of subbands.

The LBT component 730 may perform, for each subband of the set of subbands, an LBT procedure that is selected for each subband based on identifying that the transmission time interval is during the COT for the base station.

The uplink transmitter 735 may transmit the uplink message on the set of subbands based on a result of the performed LBT procedure for each subband of the set of subbands.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

In some cases, the message component 720, the COT component 725, the LBT component 730, and the uplink transmitter 735 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the message component 720, the COT component 725, the LBT component 730, and the uplink transmitter 735 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 8:
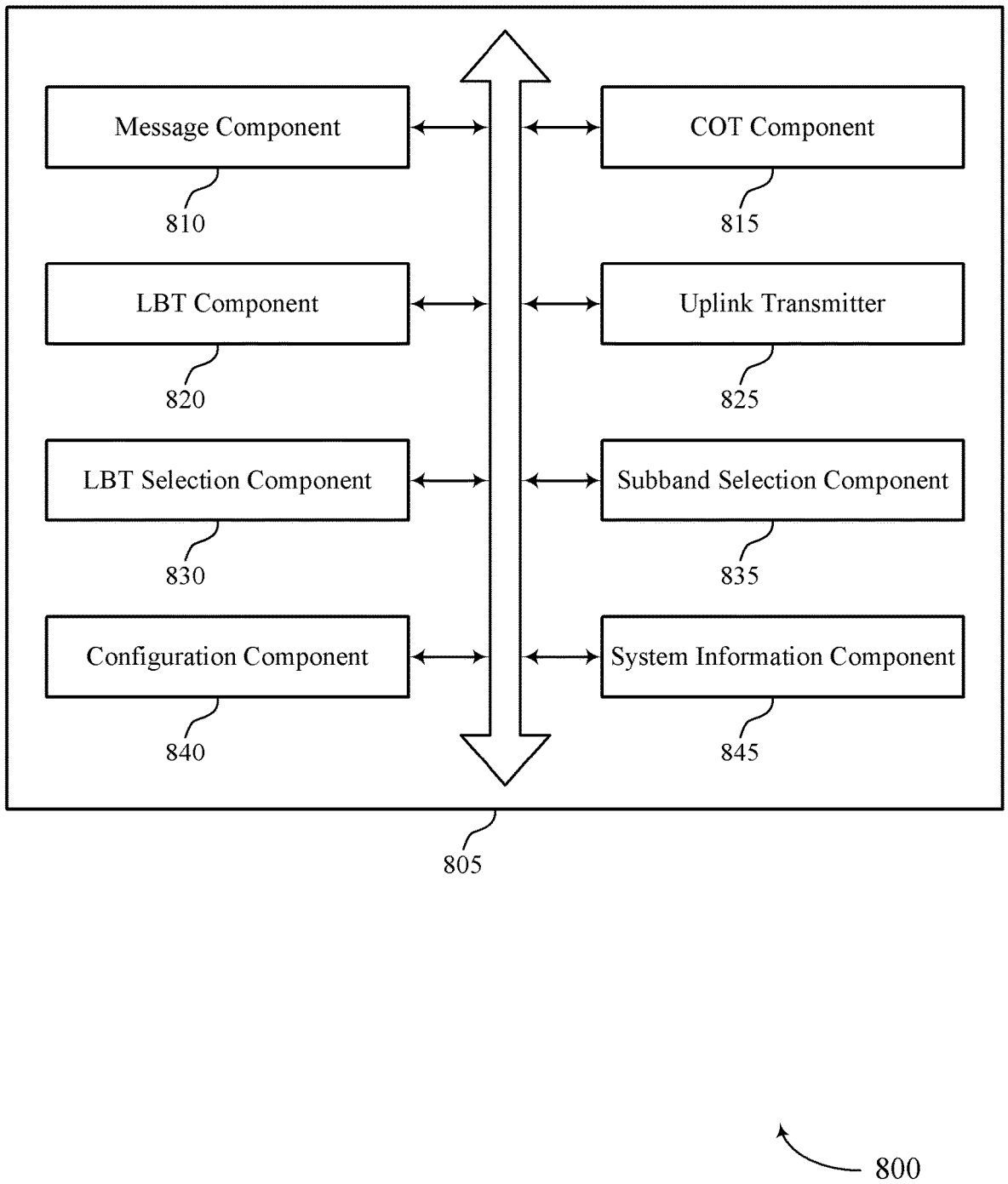
FIG. 8 shows a block diagram of a communications manager that supports LBT techniques for wireless communications systems in accordance with aspects of the present disclosure.

FIG. 8 shows a block diagram 800 of a communications manager 805 that supports LBT techniques for wireless communications systems in accordance with aspects of the present disclosure. The communications manager 805 may be an example of aspects of a communications manager 615, a communications manager 715, or a communications manager 910 described herein. The communications manager 805 may include a message component 810, a COT component 815, an LBT component 820, an uplink transmitter 825, an LBT selection component 830, a subband selection component 835, a configuration component 840, and a system information component 845. Each of these modules may communicate, directly or indirectly, with one another (e.g., via one or more buses).

The message component 810 may determine to transmit, to a base station during a transmission time interval, an uplink message on a set of subbands of a radio frequency spectrum band.

The COT component 815 may identify that the transmission time interval is during a COT for the base station for a first set of subbands of the set of subbands. In some examples, the COT component 815 may determine that the transmission time interval is during the COT for the base station for all subbands of the set of subbands, where the first set of subbands includes the set of subbands. In some examples, the COT component 815 may determine that the transmission time interval is outside of the COT for the base station for all subbands of the set of subbands, where the first set of subbands includes the set of subbands.

In some examples, the COT component 815 may identify that a previous transmission time interval is outside the COT for a second set of subbands of the set of subbands. In some examples, determining that the transmission time interval is during the COT for all subbands of the set of subbands, where the first set of subbands includes the set of subbands.

The LBT component 820 may perform, for each subband of the set of subbands, an LBT procedure that is selected for each subband based on identifying that the transmission time interval is during the COT for the base station. In some examples, the LBT component 820 may refrain from performing the LBT procedure for a previous transmission time interval based on identifying that the previous transmission time interval is outside the COT. In some examples, the LBT component 820 may perform a first LBT procedure for the selected first subband of the set of subbands and a second LBT procedure for a remaining one or more subbands of the set of subbands.

In some examples, the LBT component 820 may perform the second LBT procedure for a remaining one or more subbands of the set of subbands, the remaining one or more subbands different than the selected first subband. In some examples, the LBT component 820 may perform a first LBT procedure for the selected first subband. In some examples, the LBT component 820 may perform a second LBT procedure for a remaining one or more subbands of the set of subbands. In some cases, the LBT procedure for each subband of the set of subbands includes a same LBT procedure. In some cases, the first LBT procedure includes a category 4 LBT procedure and the second LBT procedure includes a category 2 LBT procedure.

The uplink transmitter 825 may transmit the uplink message on the set of subbands based on a result of the performed LBT procedure for each subband of the set of subbands. In some examples, the uplink transmitter 825 may transmit, during the uplink message on the set of subbands based on identifying that the transmission time interval is during the COT for the base station for all subbands of the set of subbands or that the transmission time interval is outside the COT for the base station for all subbands of the set of subbands. In some examples, the uplink transmitter 825 may transmit the uplink message on the set of subbands is in response to the result of the performed LBT procedure for each subband of the set of subbands, including the first LBT procedure and the second LBT procedure, indicating that all subbands of the set of subbands are clear.

The LBT selection component 830 may select the LBT procedure to be a category 2 LBT procedure. In some examples, the LBT selection component 830 may select the LBT procedure to be a category 4 LBT procedure. In some examples, the LBT selection component 830 may select a same LBT procedure for each subband of the set of subbands based on the transmission time interval being during the COT for the base station for all the subbands.

In some examples, the LBT selection component 830 may select a first LBT procedure for the selected first subband based on identifying that the transmission time interval is outside the COT for the first subband, or a second LBT procedure for the selected first subband based on identifying that the transmission time interval is during the COT for the first subband. In some examples, the LBT selection component 830 may select the first subband randomly from the first set of subbands for which the transmission time interval is during the COT for the base station. In some cases, the first LBT procedure includes a category 4 LBT procedure and the second LBT procedure includes a category 2 LBT procedure.

In some examples, the subband selection component 835 may select a first subband of the set of subbands. In some examples, the subband selection component 835 may select the first subband randomly from the set of subbands. In some examples, the subband selection component 835 may select a first subband of the set of subbands based on determining that the transmission time interval is outside the COT for at least one subband of the set of subbands. In some cases, the first LBT procedure includes a category 4 LBT procedure and the second LBT procedure includes a category 2 LBT procedure.

The configuration component 840 may receive, from the base station, an uplink configuration for the UE that indicates the set of subbands of the radio frequency spectrum band. In some examples, the configuration component 840 may receive radio resource control signal indicating the uplink configuration, a downlink control information signal indicating the uplink configuration, or a combination thereof.

The system information component 845 may receive, from the base station, system information indicating, for each subband of the set of subbands, a result of an LBT procedure performed by the base station, where identifying that the transmission time interval is during the COT is based on the received system information. In some cases, the system information includes a bitmap, each bit of the bitmap corresponding to the result of the LBT procedure for a respective one subband of the set of subbands.

In some cases, the message component 810, the COT component 815, the LBT component 820, the uplink transmitter 825, the LBT selection component 830, the subband selection component 835, the configuration component 840, and the system information component 845 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the message component 810, the COT component 815, the LBT component 820, the uplink transmitter 825, the LBT selection component 830, the subband selection component 835, the configuration component 840, and the system information component 845 discussed herein.

Figure 9:
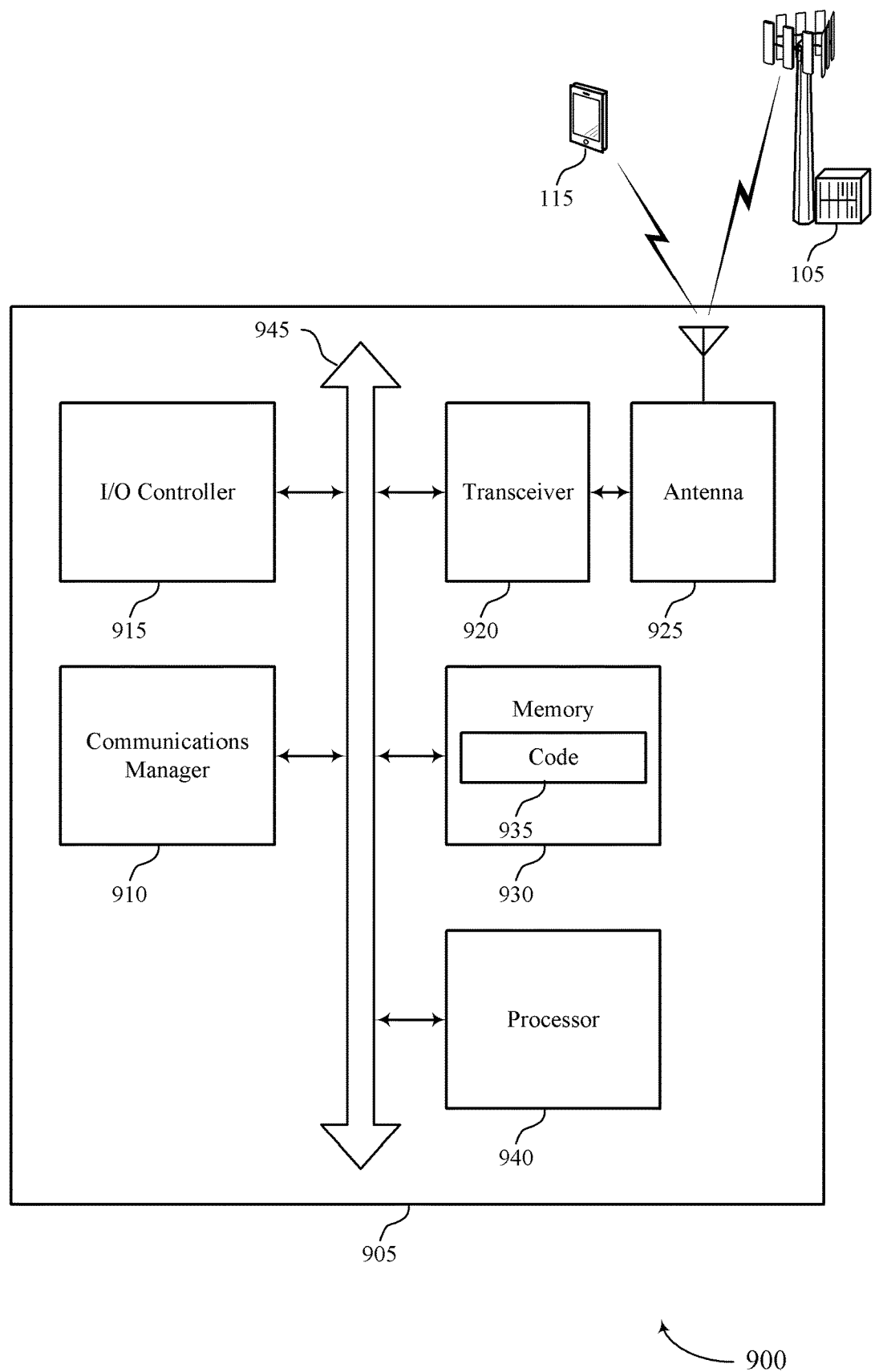
FIG. 9 shows a diagram of a system including a device that supports LBT techniques for wireless communications systems in accordance with aspects of the present disclosure.

FIG. 9 shows a diagram of a system 900 including a device 905 that supports LBT techniques for wireless communications systems in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine to transmit, to a base station during a transmission time interval, an uplink message on a set of subbands of a radio frequency spectrum band, identify that the transmission time interval is during a COT for the base station for a first set of subbands of the set of subbands, perform, for each subband of the set of subbands, an LBT procedure that is selected for each subband based on identifying that the transmission time interval is during the COT for the base station, and transmit the uplink message on the set of subbands based on a result of the performed LBT procedure for each subband of the set of subbands.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting LBT techniques for wireless communications systems).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
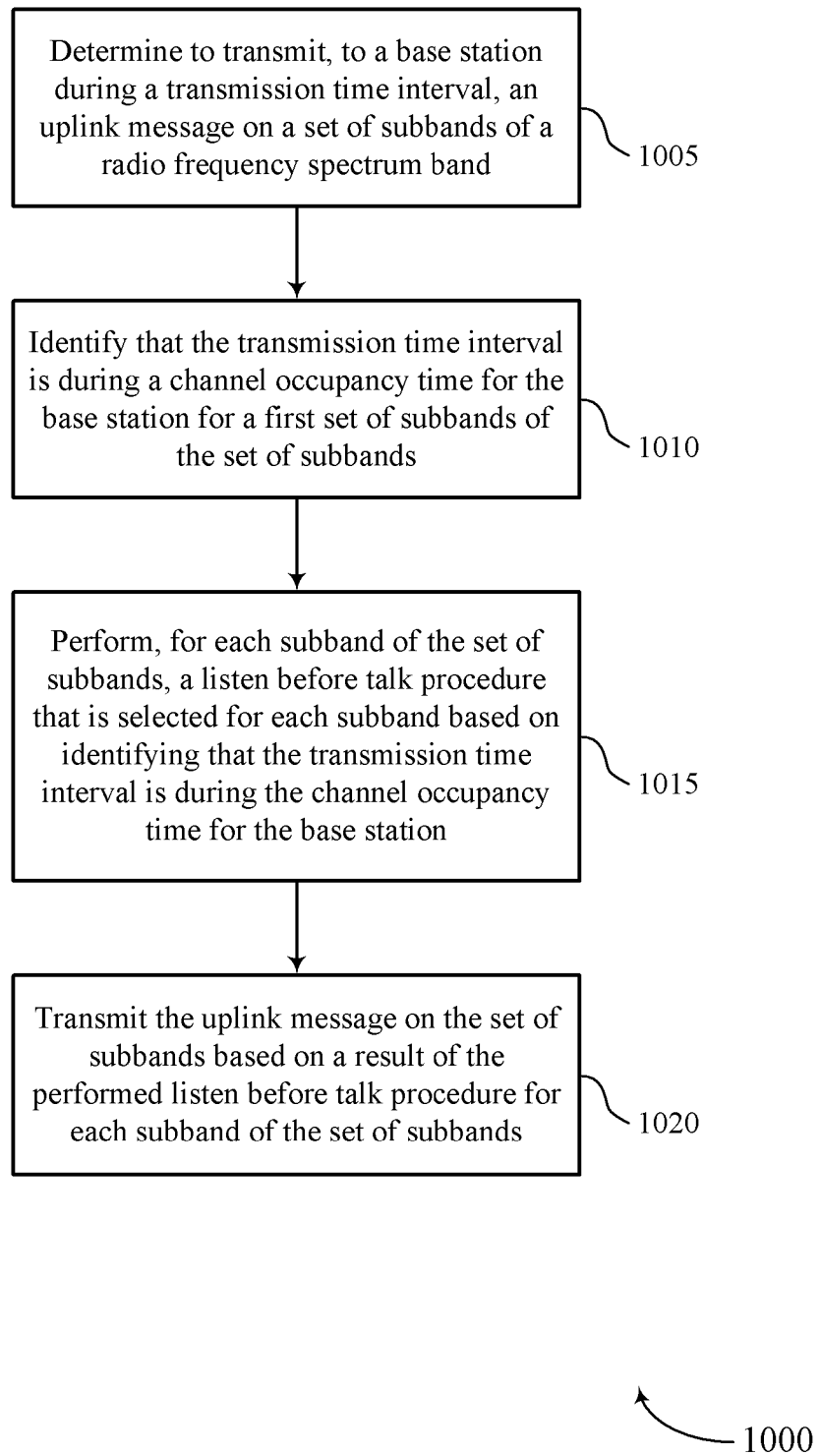
FIGS. 10 and 11 show flowcharts illustrating methods that support LBT techniques for wireless communications systems in accordance with aspects of the present disclosure.

FIG. 10 shows a flowchart illustrating a method 1000 that supports LBT techniques for wireless communications systems in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may determine to transmit, to a base station during a transmission time interval, an uplink message on a set of subbands of a radio frequency spectrum band. The operations of 1005 may be performed according to the methods described herein. In some examples, aspects of the operations of 1005 may be performed by a message component as described with reference to FIGS. 6 through 9.

At 1010, the UE may identify that the transmission time interval is during a COT for the base station for a first set of subbands of the set of subbands. The operations of 1010 may be performed according to the methods described herein. In some examples, aspects of the operations of 1010 may be performed by a COT component as described with reference to FIGS. 6 through 9.

At 1015, the UE may perform, for each subband of the set of subbands, an LBT procedure that is selected for each subband based on identifying that the transmission time interval is during the COT for the base station. The operations of 1015 may be performed according to the methods described herein. In some examples, aspects of the operations of 1015 may be performed by an LBT component as described with reference to FIGS. 6 through 9.

At 1020, the UE may transmit the uplink message on the set of subbands based on a result of the performed LBT procedure for each subband of the set of subbands. The operations of 1020 may be performed according to the methods described herein. In some examples, aspects of the operations of 1020 may be performed by an uplink transmitter as described with reference to FIGS. 6 through 9.

Figure 11:
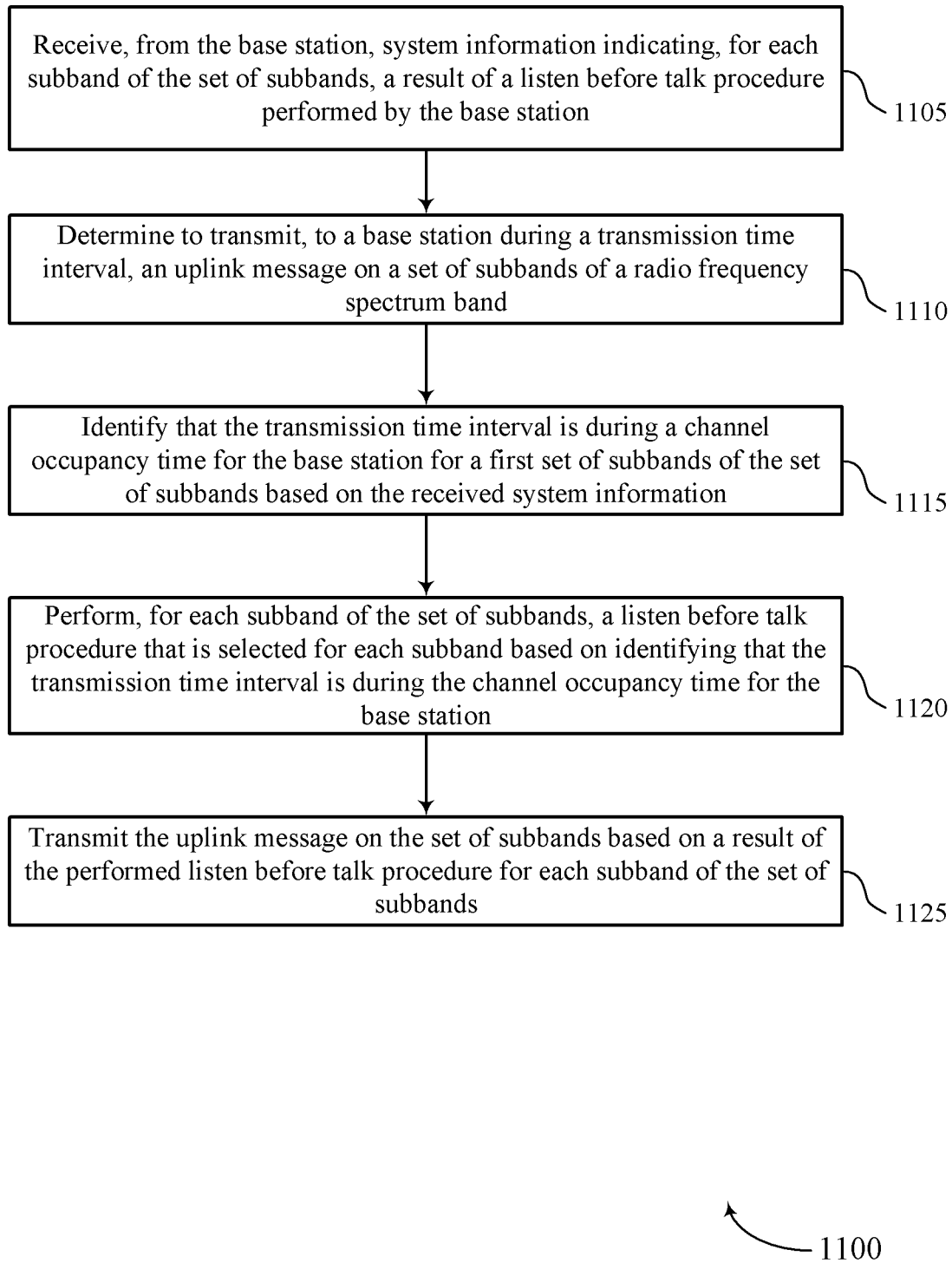

FIG. 11 shows a flowchart illustrating a method 1100 that supports LBT techniques for wireless communications systems in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive, from the base station, system information indicating, for each subband of the set of subbands, a result of an LBT procedure performed by the base station. The operations of 1105 may be performed according to the methods described herein. In some examples, aspects of the operations of 1105 may be performed by a system information component as described with reference to FIGS. 6 through 9.

At 1110, the UE may determine to transmit, to a base station during a transmission time interval, an uplink message on a set of subbands of a radio frequency spectrum band. The operations of 1110 may be performed according to the methods described herein. In some examples, aspects of the operations of 1110 may be performed by a message component as described with reference to FIGS. 6 through 9.

At 1115, the UE may identify that the transmission time interval is during a COT for the base station for a first set of subbands of the set of subbands based on the received system information. The operations of 1115 may be performed according to the methods described herein. In some examples, aspects of the operations of 1115 may be performed by a COT component as described with reference to FIGS. 6 through 9.

At 1120, the UE may perform, for each subband of the set of subbands, an LBT procedure that is selected for each subband based on identifying that the transmission time interval is during the COT for the base station. The operations of 1120 may be performed according to the methods described herein. In some examples, aspects of the operations of 1120 may be performed by an LBT component as described with reference to FIGS. 6 through 9.

At 1125, the UE may transmit the uplink message on the set of subbands based on a result of the performed LBT procedure for each subband of the set of subbands. The operations of 1125 may be performed according to the methods described herein. In some examples, aspects of the operations of 1125 may be performed by an uplink transmitter as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   one or more processors, memory coupled with the one or more processors; and
   instructions stored in the memory and executable by the one or more processors to cause the apparatus to:
      determine to transmit, to a base station during a transmission time interval, an uplink message on a plurality of subbands of a radio frequency spectrum band;
      identify that the transmission time interval is during a channel occupancy time for the base station for a first set of subbands of the plurality of subbands;
      perform a first listen before talk procedure for a first subband of the plurality of subbands outside of the channel occupancy time for the base station for the first set of subbands;
      perform a second listen before talk procedure for a second subband of the plurality of subbands within the channel occupancy time for the base station for the first set of subbands, wherein the first listen before talk procedure differs from the second listen before talk procedure; and
      transmit, via the transmission time interval, the uplink message on the first subband and the second subband of the plurality of subbands based at least in part on a result of the first listen before talk procedure and a result of the second listen before talk procedure.

2. The apparatus of claim 1, wherein the first set of subbands includes the second subband.

3. The apparatus of claim 2, wherein the instructions are further executable by the one or more processors to cause the apparatus to:
   select the second listen before talk procedure to be a category 2 listen before talk procedure.

4. The apparatus of claim 2, wherein the instructions are further executable by the one or more processors to cause the apparatus to:

select the first listen before talk procedure to be a category 4 listen before talk procedure.

5. The apparatus of claim 1, wherein the instructions are further executable by the one or more processors to cause the apparatus to:
perform the second listen before talk procedure for a remaining one or more subbands of the plurality of subbands.

6. The apparatus of claim 1, wherein the instructions are further executable by the one or more processors to select the first subband by being executable by the one or more processors to:
select the first subband randomly from a second set of subbands.

7. The apparatus of claim 1, wherein the result of the first listen before talk procedure indicates that the first subband is clear and the result of the second listen before talk procedure indicates that the second subband is clear.

8. The apparatus of claim 1, wherein the instructions are further executable by the one or more processors to cause the apparatus to:
receive, from the base station, an uplink configuration for the UE that indicates the plurality of subbands of the radio frequency spectrum band.

9. The apparatus of claim 8, wherein the instructions are further executable by the one or more processors to receive the uplink configuration by being executable by the one or more processors to:
receive radio resource control signal indicating the uplink configuration, a downlink control information signal indicating the uplink configuration, or a combination thereof.

10. The apparatus of claim 1, wherein the instructions are further executable by the one or more processors to cause the apparatus to:
receive, from the base station, information indicating, for each subband of the plurality of subbands, a result of a listen before talk procedure performed by the base station, wherein identification that the transmission time interval is during the channel occupancy time is based at least in part on the information.

11. The apparatus of claim 10, wherein the information comprises a bitmap, each bit of the bitmap corresponding to the result of the listen before talk procedure performed by the base station for a respective one subband of the plurality of subbands.

12. An apparatus for wireless communications at a user equipment (UE), comprising:
one or more processors,
memory coupled with the one or more processors; and
instructions stored in the memory and executable by the one or more processors to cause the apparatus to:
determine to transmit, to a base station during a transmission time interval, an uplink message on a plurality of subbands of a radio frequency spectrum band;
identify that the transmission time interval is during a channel occupancy time for the base station for a first set of subbands of the plurality of subbands;
perform, for each subband of the plurality of subbands, a listen before talk procedure that is selected for each subband based at least in part on identification that the transmission time interval is during the channel occupancy time for the base station;
identify that a previous transmission time interval is outside the channel occupancy time for a second set of subbands of the plurality of subbands;
refrain from performing the listen before talk procedure for the previous transmission time interval based at least in part on identification that the previous transmission time interval is outside the channel occupancy time; and
transmit the uplink message on the plurality of subbands based at least in part on a result of the listen before talk procedure performed for each subband of the plurality of subbands and identification that the transmission time interval is during the channel occupancy time for the base station for all subbands of the plurality of subbands or that the transmission time interval is outside the channel occupancy time for the base station for all subbands of the plurality of subbands.

13. The apparatus of claim 12, wherein the instructions are further executable by the one or more processors to perform, for each subband of the plurality of subbands, a listen before talk procedure by being executable by the one or more processors to:
select a first subband of the plurality of subbands;
select a first listen before talk procedure for the first subband based at least in part on identifying that the transmission time interval is outside the channel occupancy time for the first subband, or a second listen before talk procedure for the first subband based at least in part on identification that the transmission time interval is during the channel occupancy time for the first subband; and
perform the second listen before talk procedure for a remaining one or more subbands of the plurality of subbands, the remaining one or more subbands different than the first subband.

14. The apparatus of claim 13, wherein the first listen before talk procedure comprises a category 4 listen before talk procedure and the second listen before talk procedure comprises a category 2 listen before talk procedure.

15. The apparatus of claim 12, wherein the instructions are further executable by the one or more processors to perform, for each subband of the plurality of subbands, a listen before talk procedure by being executable by the one or more processors to:
select a first subband of the first set of subbands;
perform a first listen before talk procedure for the first subband; and
perform a second listen before talk procedure for a remaining one or more subbands of the plurality of subbands.

16. The apparatus of claim 15, wherein the instructions are further executable by the one or more processors to select the first subband by being executable by the one or more processors to:
select the first subband randomly from the first set of subbands for which the transmission time interval is during the channel occupancy time for the base station.

17. The apparatus of claim 15, wherein the first listen before talk procedure comprises a category 4 listen before talk procedure and the second listen before talk procedure comprises a category 2 listen before talk procedure.

18. A method for wireless communications at a user equipment (UE), comprising:
determining to transmit, to a base station during a transmission time interval, an uplink message on a plurality of subbands of a radio frequency spectrum band;
identifying that the transmission time interval is during a channel occupancy time for the base station for a first set of subbands of the plurality of subbands;

performing a first listen before talk procedure for a first subband of the plurality of subbands outside of the channel occupancy time for the base station for the first set of subbands;

performing a second listen before talk procedure for a second subband of the plurality of subbands within the channel occupancy time for the base station for the first set of subbands, wherein the first listen before talk procedure differs from the second listen before talk procedure; and transmitting, via the transmission time interval, the uplink message on the first subband and the second subband of the plurality of subbands based at least in part on a result of the first listen before talk procedure and a result of the second listen before talk procedure.

19. The method of claim 18, wherein the first set of subbands includes the second subband.

20. The method of claim 18, wherein transmitting the uplink message on the plurality of subbands comprises:
identifying that a previous transmission time interval is outside the channel occupancy time for a second set of subbands of the plurality of subbands; and
refraining from performing a listen before talk procedure for the previous transmission time interval based at least in part on identifying that the previous transmission time interval is outside the channel occupancy time.

21. The method of claim 18, wherein the first listen before talk procedure comprises a category 4 listen before talk procedure and the second listen before talk procedure comprises a category 2 listen before talk procedure.

22. The method of claim 18, further comprising:
performing the second listen before talk procedure for a remaining one or more subbands of the plurality of subbands.

23. The method of claim 18, wherein the result of the first listen before talk procedure indicates that the first subband is clear and the result of the second listen before talk procedure indicates that the second subband is clear.

24. The method of claim 18, further comprising:
selecting the second subband randomly from the first set of subbands.

25. The method of claim 18, further comprising:
receiving, from the base station, an uplink configuration for the UE that indicates the plurality of subbands of the radio frequency spectrum band.

26. The method of claim 18, further comprising:
receiving, from the base station, information indicating, for each subband of the plurality of subbands, a result of a listen before talk procedure performed by the base station, wherein identifying that the transmission time interval is during the channel occupancy time is based at least in part on the information.

* * * * *